US012695723B1

(12) United States Patent　(10) Patent No.:　US 12,695,723 B1

Weisfeld　(45) Date of Patent:　Jul. 28, 2026

(54) METHOD AND SYSTEM FOR MIGRATING WEB APPLICATION FIREWALL (WAF) CONFIGURATION DATA ACROSS WAF PROVIDERS

(71) Applicant: Huskeys Security LTD, Tel Aviv (IL)

(72) Inventor: Roy Weisfeld, Herzliya (IL)

(73) Assignee: Huskeys Security LTD, Tel Aviv (IL)

( * ) Notice: Subject to any disclaimer, the term of this patent is extended or adjusted under 35 U.S.C. 154(b) by 0 days.

(21) Appl. No.: 19/435,180

(22) Filed: Dec. 29, 2025

(51) Int. Cl.
　*H04L 9/40*　(2022.01)
　*G06F 16/22*　(2019.01)
(52) U.S. Cl.
　CPC ...... *H04L 63/0263* (2013.01); *G06F 16/2237* (2019.01)
(58) Field of Classification Search
　CPC .......................... H04L 63/0263; G06F 16/2237
　See application file for complete search history.

(56) References Cited

U.S. PATENT DOCUMENTS

| | | | | | |
|---|---|---|---|---|---|
| 2013/0019314 A1* | 1/2013 | Ji | .......................... | H04L 63/168 726/25 |
| 2016/0337317 A1* | 11/2016 | Hwang | ................. | H04L 43/045 |
| 2019/0288915 A1* | 9/2019 | Denyer | ................. | G06F 16/252 |
| 2019/0364072 A1* | 11/2019 | Purusothaman | .... | H04L 63/0263 |
| 2020/0067962 A1* | 2/2020 | Tan | ..................... | G06F 16/9027 |
| 2021/0194852 A1* | 6/2021 | Shomer | .................. | H04L 67/02 |
| 2021/0314368 A1* | 10/2021 | Hensley | ............... | H04L 67/561 |
| 2022/0210122 A1* | 6/2022 | Levin | .................. | H04L 63/0218 |
| 2023/0396588 A1* | 12/2023 | Shavit | ................. | H04L 63/0263 |
| 2025/0219999 A1* | 7/2025 | Palan | ................... | H04L 63/029 |
| 2025/0317350 A1* | 10/2025 | Iyer | ..................... | H04L 41/0806 |
| 2026/0023842 A1* | 1/2026 | Neystadt | ................ | G06F 21/45 |

\* cited by examiner

*Primary Examiner* — Harris C Wang

(74) *Attorney, Agent, or Firm* — M&B IP Analysts, LLC

(57)　　　　　　ABSTRACT

The method and system for migrating web application firewall (WAF) rules across different WAF providers is presented. The method includes parsing a plurality of WAF rules from a plurality of WAF providers, wherein the plurality of WAF rules is expressed in varying provider-specific formats; enriching a source WAF rule of a source WAF provider with organizational context; generating, using a trained cross-provider semantic similarity model, a provider-agnostic language representation of the source WAF rule based on the provider-specific format of the source WAF rule and the organizational context; constructing a capability model of a target WAF provider; generating, using the trained cross-provider semantic similarity model, a target WAF rule for deployment in the target WAF provider based on the provider-agnostic language representation of the source WAF rule and compatible with the capability model; and coordinating a staged deployment of the target WAF rule in the target WAF provider.

19 Claims, 7 Drawing Sheets

600

S610 — Parse WAF rules from multiple WAF providers

S620 — Enrich a source WAF rule of a source WAF provider with organizational context S630 — Generate a provider-agnostic language representation of the source WAF rule S640 — Construct a capability model of the target WAF provider S650 — Generate a target WAF rule for deployment in the target WAF provider S660 — Coordinate a staged deployment of the target WAF rule in the target WAF provider

100

| Network-Edge WAF Service 140-1 | Cloud-Native WAF Service 150-1 | Web Application 160-1 |
|---|---|---|
| Network-Edge WAF Service 140-2 | Cloud-Native WAF Service 150-2 | Web Application 160-2 |
| ▪ ▪ ▪ | ▪ ▪ ▪ | ▪ ▪ ▪ |
| Network-Edge WAF Service 140-N | Cloud-Native WAF Service 150-N | Web Application 160-N |

Client 120-1

Client 120-2

▪ ▪ ▪

Client 120-N

Network 110

Misconfiguration Detection System 130

Cross-Provider Migration System 135

Cyber Data Source 170

Data Store 180

<u>400</u>

<u>S410</u>

Parse WAF configuration data

<u>S420</u>

Normalize edge WAF data and cloud WAF data

<u>S430</u>

Enrich WAF configuration data with web app data

<u>S440</u>

Detect conditions indicative of sub-optimal WAF configurations

<u>S450</u>

Transmit over a user interface remediation outputs to effect WAF configuration changes

500

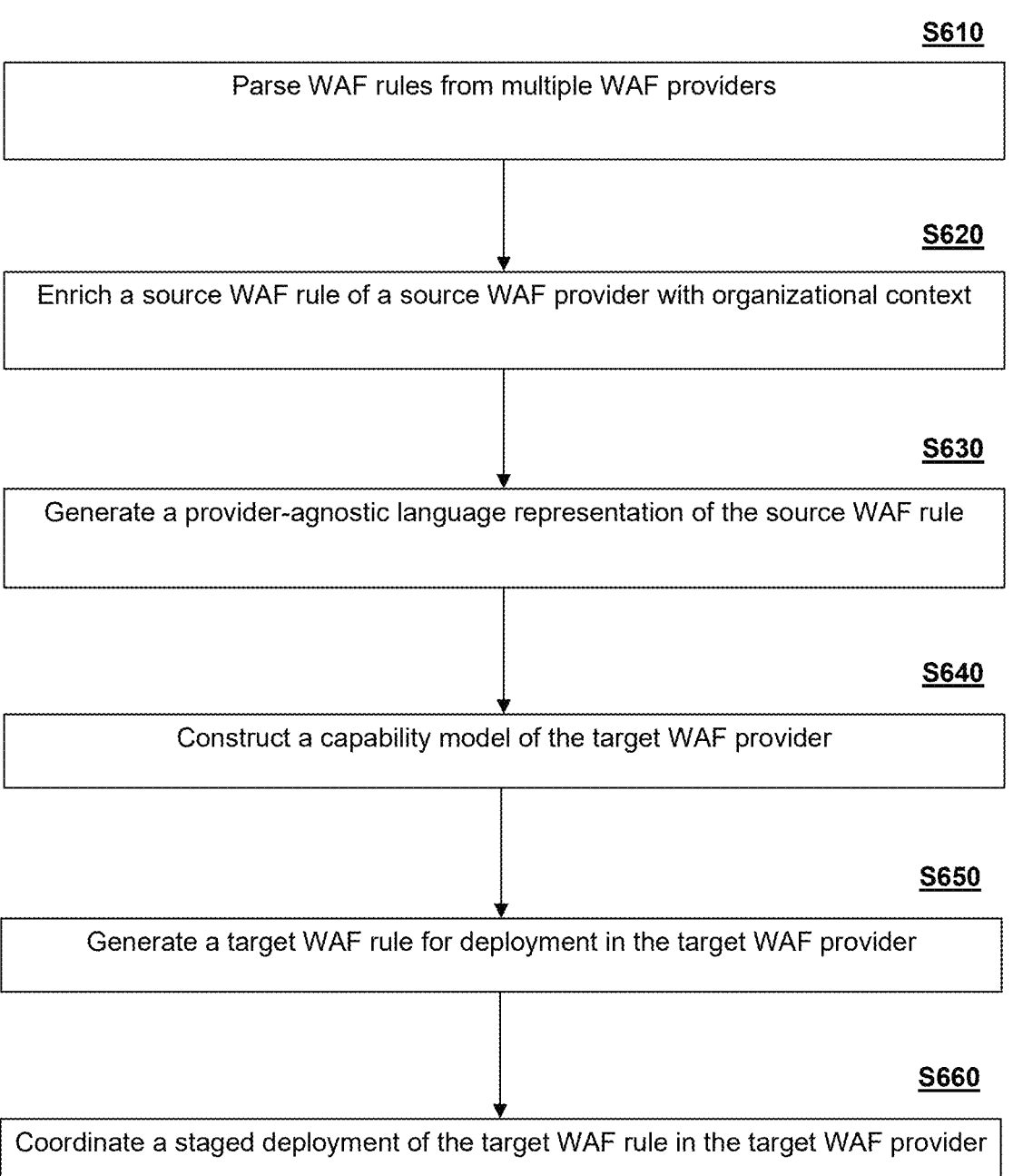

600

S610
Parse WAF rules from multiple WAF providers

S620
Enrich a source WAF rule of a source WAF provider with organizational context S630
Generate a provider-agnostic language representation of the source WAF rule S640
Construct a capability model of the target WAF provider S650
Generate a target WAF rule for deployment in the target WAF provider S660
Coordinate a staged deployment of the target WAF rule in the target WAF provider

METHOD AND SYSTEM FOR MIGRATING WEB APPLICATION FIREWALL (WAF) CONFIGURATION DATA ACROSS WAF PROVIDERS

TECHNICAL FIELD

This disclosure generally relates to cybersecurity and, more particularly, to the mechanisms for migrating WAF configuration data across WAF providers.

BACKGROUND

Modern web applications depend on multiple layers of protection and performance systems, including Web Application Firewalls (WAFs) (e.g., Cloudflare, Akamai, Imperva); Content Delivery Networks (CDNs); (e.g., Lime-line, Akamia) and Cloud-native platforms (e.g., AWS, Azure, GCP). WAF configurations are often distributed across multiple environments, accounts, regions, and providers, each with its own configuration model, terminology, and management interfaces. This fragmentation creates significant operational complexity and reduces visibility into how web applications are actually protected across an organization.

A fundamental problem in WAF security management is the lack of interoperability and semantic consistency between different WAF providers. Although WAFs inspect the same underlying HTTP and HTTPS traffic elements and address the same classes of application-layer threats, each provider exposes controls using different rule languages, abstractions, and feature sets. Equivalent security intent may be expressed in materially different ways across platforms. As a result, security teams struggle to understand, compare, or reason about WAF configurations across vendors, and there is no reliable way to determine whether protections are equivalent or complete in multi-vendor environments.

Another significant shortcoming is the opacity and complexity of WAF configurations themselves. Over time, WAF rulesets tend to accumulate overlapping rules, redundant conditions, outdated exceptions, and poorly named or undocumented controls. Many WAF rules are expressed as low-level configuration artifacts or nested logical expressions that are difficult for humans to interpret, even for experienced security practitioners. This lack of explainability makes it challenging to assess rule intent, identify misconfigurations, or understand the impact of changes, particularly in large environments with hundreds or thousands of rules.

Additionally, organizations may need to change providers due to cost, performance, feature availability, regulatory requirements, or architectural changes. However, WAF providers do not offer standardized migration paths, and existing configurations cannot be directly transferred due to incompatible formats and semantics. Manual migration efforts require deep expertise in both the source and target platforms and are error-prone, time-consuming, and risky. During migration periods, organizations often experience gaps in protection, inconsistent enforcement, or unintended service disruption because configurations are partially implemented or incorrectly translated.

Therefore, it would be advantageous to provide a solution that would cure the deficiencies noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, the method may include parsing a plurality of WAF rules from a plurality of WAF providers, where the plurality of WAF rules is expressed in varying provider-specific formats. The method may also include enriching a source WAF rule of a source WAF provider of the plurality of WAF providers with organizational context derived from a plurality of signals from a tenant computing environment; generating, using a trained cross-provider semantic similarity model, a provider-agnostic language representation of the source WAF rule based on the provider-specific format of the source WAF rule and the organizational context; constructing a capability model of a target WAF provider of the plurality of WAF providers including at least rule types, features, and constraints supported by a target WAF provider; generating, using the trained cross-provider semantic similarity model, a target WAF rule for deployment in the target WAF provider based on the provider-agnostic language representation of the source WAF rule and compatible with the capability model of the target WAF provider; and coordinating a staged deployment of the target WAF rule in the target WAF provider. Other embodiments of this aspect include corresponding computer systems, apparatus, and computer programs recorded on one or more computer storage devices, each configured to perform the actions of the methods.

Implementations may include one or more of the following features. The method generating the target WAF rule further may include: generating a candidate WAF rule for deployment in the target WAF provider based on the provider-agnostic language representation of the source WAF rule and the capability model of the target WAF provider; generating a first vector representation, in a vector database, of the provider-agnostic language representation of the source WAF rule; generating a candidate vector representation, in the vector database, of the candidate WAF rule; computing a distance in the vector database between the first vector representation and the candidate vector representation; and determining the candidate WAF rule as the target WAF rule when the computed distance is below a predetermined distance threshold.

The method may include: detecting a security intent of the source WAF rule based on the provider-agnostic language representation; determining, using the capability model of the target WAF provider, when the security intent can be implemented in the target WAF rule with reduced complexity from the source WAF rule; and when the security intent can be implemented in the target WAF rule with reduced complexity from the source WAF rule, generating a reduced-complexity target WAF rule for the target WAF provider.

The method where generating the provider-agnostic language representation further may include: encoding parsed logic, conditions, match fields, and actions of the source WAF rule into a vectorized representation using the trained cross-provider semantic similarity model that transforms rule structures into numerical feature vectors; computing, by the trained cross-provider semantic similarity model, semantic similarity scores between the vectorized representation of the source WAF rule and a plurality of predefined universal security intent representations corresponding to common web application protection objectives; and selecting, based on the computed semantic similarity scores satisfying a predetermined similarity threshold, a normalized security intent definition that represents an underlying security objective of the source WAF rule independently of vendor-specific syntax.

The method where enriching the source WAF rule with organizational context further may include: analyzing the plurality of signals including domain relationships, infrastructure metadata, certificate associations, and traffic characteristics clustering a plurality of web application assets of the tenant into logical application groupings; and associating the source WAF rule with at least one clustered web application asset.

The method where clustering a plurality of web application assets of the tenant into logical application groupings further may include: assigning weights to the multiple signals; computing a composite correlation score for a pair of web application assets; and merging the pair web application assets into a common cluster when the composite correlation score exceeds a predetermined threshold.

The method may include: detecting, using the trained cross-provider semantic similarity model, a security intent of each WAF rule of the plurality of WAF rules; correlating security intents of the plurality of WAF rules with the plurality of signals including business logic, observed traffic patterns, and protected application assets of the tenant; detecting at least one of conflicting rules, redundant rules, ineffective rules, coverage gaps, or rules misaligned with the organizational context.

The method where coordinating the staged deployment further may include: maintaining active enforcement of security controls in both the source WAF provider and the target WAF provider during a migration interval, such that protection of protected web application assets is continuously enforced by at least one of the source WAF provider or the target WAF provider at all times.

The method where coordinating the staged deployment further may include: prior to deploying the target WAF rule, executing a machine learning model trained on historical traffic telemetry to predict an impact of the target WAF rule on legitimate traffic; computing at least one risk metric indicative of legitimate traffic disruption based on the prediction; and adjusting deployment parameters of the staged deployment based on the computed risk metric. Implementations of the described techniques may include hardware, a method or process, or a computer tangible medium.

In one general aspect, the non-transitory computer-readable medium may include one or more instructions that, when executed by one or more processing circuitries of a device, cause the device to: parse a plurality of WAF rules from a plurality of WAF providers, where the plurality of WAF rules is expressed in varying provider-specific formats; enrich a source WAF rule of a source WAF provider of the plurality of WAF providers with organizational context derived from a plurality of signals from a tenant computing environment; generate, using a trained cross-provider semantic similarity model, a provider-agnostic language representation of the source WAF rule based on the provider-specific format of the source WAF rule and the organizational context; construct a capability model of a target WAF provider of the plurality of WAF providers including at least rule types, features, and constraints supported by a target WAF provider; generate, using the trained cross-provider semantic similarity model, a target WAF rule for deployment in the target WAF provider based on the provider-agnostic language representation of the source WAF rule and compatible with the capability model of the target WAF provider; coordinate a staged deployment of the target WAF rule in the target WAF provider. Other embodiments of this aspect include corresponding computer systems, apparatus, and computer programs recorded on one or more computer storage devices, each configured to perform the actions of the methods.

In one general aspect, the system may include a processing circuitry. The system may also include a memory, the memory containing instructions that, when executed by the processing circuitry, configure the system to: parse a plurality of WAF rules from a plurality of WAF providers, where the plurality of WAF rules is expressed in varying provider-specific formats; enrich a source WAF rule of a source WAF provider of the plurality of WAF providers with organizational context derived from a plurality of signals from a tenant computing environment; generate, using a trained cross-provider semantic similarity model, a provider-agnostic language representation of the source WAF rule based on the provider-specific format of the source WAF rule and the organizational context; construct a capability model of a target WAF provider of the plurality of WAF providers including at least rule types, features, and constraints supported by a target WAF provider; generate, using the trained cross-provider semantic similarity model, a target WAF rule for deployment in the target WAF provider based on the provider-agnostic language representation of the source WAF rule and compatible with the capability model of the target WAF provider; coordinate a staged deployment of the target WAF rule in the target WAF provider. Other embodiments of this aspect include corresponding computer systems, apparatus, and computer programs recorded on one or more computer storage devices, each configured to perform the actions of the methods.

Implementations may include one or more of the following features. The system where the memory contains further instructions which when executed by the processing circuitry further configure the system to: generate a candidate WAF rule for deployment in the target WAF provider based on the provider-agnostic language representation of the source WAF rule and the capability model of the target WAF provider; generate a first vector representation, in a vector database, of the provider-agnostic language representation of the source WAF rule; generate a candidate vector representation, in the vector database, of the candidate WAF rule; compute a distance in the vector database between the first vector representation and the candidate vector representation; and determine the candidate WAF rule as the target WAF rule when the computed distance is below a predetermined distance threshold.

The system where the memory contains further instructions which when executed by the processing circuitry further configure the system to: detect a security intent of the source WAF rule based on the provider-agnostic language representation; determine, using the capability model of the target WAF provider, when the security intent can be implemented in the target WAF rule with reduced complexity from the source WAF rule; and when the security intent can be implemented in the target WAF rule with reduced complexity from the source WAF rule, generate a reduced-complexity target WAF rule for the target WAF provider.

The system where the memory contains further instructions that, when executed by the processing circuitry for generating the provider-agnostic language representation, further configure the system to: encode parsed logic, conditions, match fields, and actions of the source WAF rule into a vectorized representation using the trained cross-provider semantic similarity model that transforms rule structures into numerical feature vectors; compute, by the trained cross-provider semantic similarity model, semantic similarity scores between the vectorized representation of the source WAF rule and a plurality of predefined universal security intent representations corresponding to common web application protection objectives; and select, based on the computed semantic similarity scores satisfying a predetermined similarity threshold, a normalized security intent definition that represents an underlying security objective of the source WAF rule independently of vendor-specific syntax.

The system where the memory contains further instructions that, when executed by the processing circuitry for enriching the source WAF rule with organizational context, further configure the system to: analyze the plurality of signals including domain relationships, infrastructure metadata, certificate associations, and traffic characteristics clustering a plurality of web application assets of the tenant into logical application groupings; and associate the source WAF rule with at least one clustered web application asset.

The system where the memory contains further instructions that, when executed by the processing circuitry for clustering a plurality of web application assets of the tenant into logical application groupings, further configure the system to: assign weights to the multiple signals; compute a composite correlation score for a pair of web application assets; and merge the pair web application assets into a common cluster when the composite correlation score exceeds a predetermined threshold.

The system where the memory contains further instructions which when executed by the processing circuitry further configure the system to: detect, using the trained cross-provider semantic similarity model, a security intent of each WAF rule of the plurality of WAF rules; correlate security intents of the plurality of WAF rules with the plurality of signals including business logic, observed traffic patterns, and protected application assets of the tenant; and detect at least one of conflicting rules, redundant rules, ineffective rules, coverage gaps, or rules misaligned with the organizational context.

The system where the memory contains further instructions that, when executed by the processing circuitry for coordinating the staged deployment, further configure the system to: maintain active enforcement of security controls in both the source WAF provider and the target WAF provider during a migration interval, such that protection of protected web application assets is continuously enforced by at least one of the source WAF provider or the target WAF provider at all times.

The system where the memory contains further instructions that, when executed by the processing circuitry for coordinating the staged deployment, further configure the system to: prior to deploying the target WAF rule, execute a machine learning model trained on historical traffic telemetry to predict an impact of the target WAF rule on legitimate traffic; compute at least one risk metric indicative of legitimate traffic disruption based on the prediction; and adjust deployment parameters of the staged deployment based on the computed risk metric. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 6 is an example flowchart illustrating a process for migrating WAF configuration data across different WAF providers according to an embodiment.

DETAILED DESCRIPTION

Figure 1:
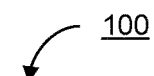
FIG. 1 shows an example network diagram utilized to describe the various disclosed embodiments.

It is important to note that the embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The disclosed method and system provide an AI-based control plane for WAF services that integrates and correlates WAF configuration data from multiple WAFs, CDNs, and cloud infrastructure providers; detects misconfigurations and optimization opportunities across vendor ecosystems; provides AI-based orchestration, summarization, and decision support for both security posture and business impact. Additionally, the disclosed method and system operate agentless, using APIs for data ingestion. The disclosed method and system act as a vendor-neutral AI-based visibility and detection layer that sits above existing protection systems. In an embodiment, the operation of the system includes ingesting data, correlating insights, and controlling configurations across disparate security and networking ecosystems.

The disclosed technology provides a technical improvement to the operation and management of web application firewall (WAF) systems by enabling cross-platform optimization of WAF configurations without deploying endpoint agents or replacing existing WAF infrastructures. Through automated normalization and correlation of configuration data from both network-edge and cloud WAF services, the system produces a unified, vendor-agnostic view of an organization's security posture. This improves detection of misconfigurations, redundant or ineffective rules, and coverage gaps that would otherwise expose applications to malicious traffic or degrade user experience. By autonomously generating and delivering remediation suggestions that adjust existing configurations rather than requiring replacement of WAF components, the system enhances security posture, operational efficiency, and application performance while reducing human administrative burden. The result is a measurable technical improvement in network protection and business continuity achieved through intelligent control-plane orchestration.

Additionally, it should be noted that the operations disclosed herein cannot be practically performed in the human mind or with pen and paper because they require automated parsing, normalization, correlation, and enrichment of machine-scale data generated by multiple distributed WAF services and cloud systems. The disclosed method executes on computing infrastructure that continuously ingests high-volume configuration datasets, transforms heterogeneous rule formats into a unified schema, and applies algorithmic and statistical correlation across structured data stores to detect sub-optimal configurations. These computations occur at speeds and scales beyond human capability and depend on persistent data structures, network interfaces, and programmatic queries that require the operation of processors and memory. The resulting remediation suggestions are automatically generated and transmitted through a machine interface to effect changes across network-edge and cloud WAF services, thereby improving the operation of computer networks in a manner that no human could manually replicate with comparable accuracy, consistency, or timeliness.

The disclosed embodiments provide substantial technical advantages by improving the way WAF configuration data is interpreted, transformed, and deployed across heterogeneous WAF provider environments. One advantage is the ability to produce improved rulesets during migration. Rather than blindly copying provider-specific configurations, the disclosed method and system abstract each rule to its underlying intent and semantics and then reconstructs that intent using the most appropriate constructs available in the target provider. This enables simplification of convoluted or inefficient rules, elimination of redundant or ineffective controls, and normalization of priorities and actions, resulting in a migrated ruleset that is often more concise, more maintainable, and more effective than the original. As a result, the migration process not only preserves security posture but can actively enhance it by removing accumulated technical debt and configuration bloat that commonly arise over time in production WAF environments.

Another advantage is accurate and reliable migration in the face of fundamental technical differences between WAF providers. Different WAF services expose security controls using different semantics, abstractions, and configuration models. These semantic mismatches present a technical problem that cannot be solved by simple format conversion. The disclosed embodiments address this problem by operating at a semantic level, using abstraction and translation to bridge differences in capabilities, rule grammars, and enforcement models. By explicitly mapping abstracted intent to target-provider constructs and selecting best-fit implementations where exact matches are unavailable, the disclosed method and system reduce the risk of gaps, regressions, or unintended behavior when customers switch WAF providers.

The disclosed method and system also improve the field of WAF security posture management by enabling continuous, machine-driven assessment and transformation of configuration data at scale. Modern WAF deployments generate and maintain large volumes of configuration data across distributed services, regions, and application assets, often with frequent changes driven by automation, DevOps pipelines, and evolving threat conditions.

In addition, the disclosed method and system improve computer technology by enabling WAF migration workflows that are safer and less disruptive to running systems. By supporting evaluation modes, staged enforcement, and iterative updates, the disclosed method and system reduce downtime and security exposure during transitions between providers. This is particularly important in distributed, cloud-based environments where traffic volumes, attack patterns, and application behavior change continuously. The ability to validate translated rules against historical and live telemetry before full enforcement helps prevent false positives, service degradation, and accidental loss of coverage, thereby improving the reliability and resilience of the underlying computing infrastructure.

Collectively, these advantages demonstrate that the disclosed method and system provide a concrete technical improvement to computer security systems and WAF configuration management, rather than merely automating a human task. Further, a human operator cannot practically perform the disclosed migration method because it requires continuous ingestion and analysis of high-volume, heterogeneous configuration datasets, correlation of rules across multiple providers and environments, and evaluation of rule effectiveness using machine-scale telemetry. The disclosed method and system automate these operations using software modules and AI-assisted reasoning, allowing thousands of rules, lists, and policies to be processed in a time frame and with a level of consistency that is impractically performed by a human operator.

FIG. 1 shows an example network diagram 100 utilized to describe the various disclosed embodiments.

The network diagram 100 illustrated in FIG. 1 includes client device 120-1 through 120-N, where N is an integer greater than 1 (hereinafter, client 120 in the singular or clients 120 in the plural); network-edge WAF service 140-1 through 140-N, wherein N is an integer greater than 1 (hereinafter, network-edge WAF service 140 in the singular or network-edge WAF services 140 in the plural); cloud computing WAF services 150-1 through 150-N, wherein N is an integer greater than 1 (hereinafter, cloud computing WAF service 150 in the singular or cloud computing WAF services 150 in the plural); web application 160-1 through 160-N, wherein N is an integer greater than 1 (hereinafter, web application 160 in the singular or web applications 160 in the plural); cyber data source 170, data store 180, misconfiguration detection system 130, and cross-provider migration system 135 connected to network 110.

Client 120 may be a personal computer, a mobile phone, a smartphone, a tablet computer, a wearable device, or any compute device, and the like. Client 120 typically includes a processor and a memory that can be configured to execute script codes, software, HTTP/S pages, and the like. In some embodiments, client 120 may be operated by a legitimate user, a legitimate program, a combination thereof, and the like. In some embodiments, client 120 may be operated by a malicious user, malicious program, a combination thereof, and the like. Clients 120 are configured to initiate requests web applications through a client-side interface displaying client-side components of web applications 160. The requests initiated by clients 120 generate web traffic that is filtered by network-edge WAF services 140 and then cloud computing WAF services 150. This is discussed in more detail with respect to description of FIG. 2.

According to the disclosed embodiments, the misconfiguration detection system 130 serves as a cloud-based control plane orchestration layer configured to provide agentless, vendor-agnostic management of ingress-to-application network security resources. The misconfiguration detection system 130 operates above existing content delivery networks (CDNs), web application firewalls (WAFs), and cloud infrastructure (including AWS, Azure, and GCP), enabling continuous evaluation of configuration states, security policies, and compliance postures across heterogeneous environments. By aggregating configuration metadata and integrating external threat intelligence, the misconfiguration detection system 130 autonomously identifies misconfigurations, missing best practices, and optimization opportunities, allowing for real-time remediation and deployment of updated control policies. The misconfiguration detection system 130 functions as an intelligent data-driven management tier capable of harmonizing diverse vendor implementations into a single logical model, thereby ensuring consistent enforcement of security policies across distributed resources.

Furthermore, misconfiguration detection system 130 provides context-aware orchestration and enrichment capabilities that extend from infrastructure resources to the edge network layer. Such capabilities employ resource augmentation and inter-resource relationship mapping to achieve deep visibility into customer environments, dynamically adjusting controls according to detected risks and business priorities. The misconfiguration detection system 130 is vendor-agnostic architecture that enables seamless comparison, translation, and normalization of WAF and CDN rule sets across multiple platforms, allowing equivalent policies to be deployed or optimized irrespective of vendor-specific syntax. Through this abstraction, the misconfiguration detection system 130 not only enhances security posture but also incorporates business impact awareness. This enables organizations to distinguish between legitimate and automated traffic, manage friction caused by bot interactions, and prioritize protection mechanisms based on operational needs. The result is an adaptive, AI-augmented control plane that reduces threat exposure earlier in the traffic funnel and provides a centralized, intelligent layer of orchestration for multi-vendor, multi-cloud cybersecurity environments.

In some embodiments, misconfiguration detection system 130 is configured to parse WAF configuration data. WAF configuration data includes, but is not limited to, edge WAF data and cloud WAF data.

Edge WAF data refers to rules for managing web application traffic by network-edge WAF service 140-1 through 140-N, wherein N is an integer greater than 1 (hereinafter, network-edge WAF service 140 in the singular or network-edge WAF services 140 in the plural). Examples of network-edge WAF services 140 include a WAF, a Content Delivery Network (CDN), and a Web Application API (application programming interface) Protection (WAAP) solution, a Distributed-Denial-of-Service (DDoS) mitigation solution, a Domain Name Service (DNS), a Bot Management solution, a combination thereof, and the like.

Cloud WAF data refers to rules for managing web application traffic by cloud computing WAF services 150-1 through 150-N, where N is an integer greater than 1 (hereinafter, cloud computing WAF service 150 in the singular or cloud computing WAF services 150 in the plural). Examples of cloud computing WAF services 150 include an Application Load Balancer (ALB), an Application Control List (ACL), a cloud-native WAF, a cloud-native WAAP, an API gateway, a service mesh, a cloud-native DDoS mitigation solution, a cloud network firewall, a Identity and Access Management (IAM) enforcement solution, a combination thereof, and the like. Cloud computing WAF services 150 are configured to maintain and enforce rules for managing web application traffic in a cloud computing environment. A cloud computing environment may be deployed in various configurations including, but not limited to, public, private, hybrid, or edge-based configurations. Examples of a cloud computing environment include Amazon Web Services®, Microsoft Azure®, Google Cloud Platform™ IBM Cloud®, Oracle Cloud®, and the like.

It should be noted that vendors of the network-edge WAF services 140 and vendors of the cloud computing WAF services 150 manage configurations differently and maintain separate telemetry data. For example, network-edge WAF services 140 maintain rules for metrics such as request counts, blocked traffic, latency, a combination thereof, and the like. Cloud computing WAF services 150 maintain rules for infrastructure-level metrics such as application control lists (ACLs), load balancer status, open ports, a combination thereof, and the like. Additionally, vendors of such services maintain rules in formats and semantics, creating divergence between WAF configuration data in terms of rule precedence, rule naming conventions, syntax, a combination thereof, and the like.

In some embodiments, misconfiguration detection system 130 is configured to normalize the edge WAF data and cloud WAF data into a unified schema in a structured data store 180 (hereinafter, data store 180 or structured data store 180). The data store 180 may be embedded within misconfiguration detection system 130 or deployed separately. As explained above, the edge WAF data and cloud WAF data are maintained by different vendors in different formats, syntax, and semantics. Normalizing refers to transforming heterogeneous data formats of the edge WAF data and the cloud WAF data across different vendors into a standardized representation (e.g., a unified schema) with unified identifiers for the WAF configuration data including assets, policies, relationships, a combination thereof, and the like. Schema refers to a defined organization of fields and relations used to persist normalized records. Data store 180 refers to a database system capable of being queried. Examples of data store 180 include, but are not limited to, a Structured Query Language (SQL) database.

In some embodiments, misconfiguration detection system 130 is configured to enrich the normalized data in the structured data store 180 with web app data. Web app data refers to data related to web application 160-1 through 160-N, wherein N is an integer greater than 1 (hereinafter, web application 160 in the singular or web applications 160 in the plural) used by a tenant organization. Web app data includes, but is not limited to, attributes of a web application 160, usage data of a web application 160, a combination thereof, and the like. Additionally, web app data includes, but is not limited to, data received from cyber data source 170. Such data is used to enrich the normalized data in the data store 180.

Cyber data source 170 is a service that provides structured, actionable information about digital threats, vulnerabilities, malicious activity, a combination thereof, and the like. Cyber data source 170 provides enrichment for security tools and analysts to more accurately detect, assess, and respond to risks in real-time. For example, cyber data source 170 may include data such as, but not limited to, known bad IPs, domain reputations, malware signatures, contextual details about threat actors, a combination thereof, and the like. Examples of data source 180 include, but are not limited to, IP and domain reputation feeds, malware hash databases, phishing URL blacklists, vulnerability databases, and threat actor profiles from commercial threat intelligence platforms.

Enriching the normalized WAF configuration data with web app data allows for detection of conditions indicative of a sub-optimal WAF configuration. Based on web app data including data about the provider of the web application, it is detected when rules are necessary for optimal performance of the web application. This includes detecting what rules are not necessary for optimal performance of the web application and what rules contribute to sub-optimal performance of the web application. A more detailed discussion of such detections is provided herein.

In some embodiments, misconfiguration detection system 130 is configured to detect conditions indicative of sub-optimal WAF configurations. Detecting conditions indicative of sub-optimal WAF configurations is based on the correlated relationships among the edge WAF data, cloud WAF data, and the web app data in the structured data store 180. In some embodiments, correlating relationships among the edge WAF data, cloud WAF data, and web app data is performed through queries to the structured data store 180.

In some embodiments, misconfiguration detection system 130 is configured to detect a condition indicative of sub-optimal WAF configurations by detecting a conflict between two or more rules indicated by the WAF configuration data. For example, the definition of one rule shown in the edge WAF data and the definition of another rule in the cloud WAF data may be in conflict.

In some embodiments, misconfiguration detection system 130 is configured to detect a condition indicative of sub-optimal WAF configurations by detecting when a rule in the WAF configuration data has a user experience impact associated with a web application. A user experience impact may include an impact of a rule on a user's experience interacting with the browser-side of a web application via a client device. A user experience impact may, in some embodiments, be associated with an impact on a target outcome of the web application including, but not limited to, a sales conversion of a user on a purchase page of an e-commerce web application. Detecting a user experience impact may involve detecting that a rule in the WAF configuration data is correlated with a metric indicative of a user experience impact. As an example, a rule in the WAF configuration data may present multiple Completely Automated Public Turing tests to tell Computers and Humans Apart (CAPTCHA) to a user at a product page of an e-commerce web application. While this rule may be deployed to protect web applications from bot traffic, this rule may be correlated with a user experience impact of, for example, a higher bounce rate (rate at which webpage visitors exit a website) at the product page.

In some embodiments, misconfiguration detection system 130 is configured to detect a condition indicative of sub-optimal WAF configurations by detecting when one or more security rules cause degradation of user interaction quality or otherwise interfere with an intended business function of a web application. For example, a WAF rule intended to prevent automated login attempts may trigger an interference (e.g., rate-limiting, temporary blocking of legitimate users who refresh or navigate quickly through the site, a combination thereof, and the like), resulting in session timeouts, forced reauthentication, and the like. In such cases, the misconfiguration detection system 130 is configured to correlate the presence of the rule with a measurable increase in session termination events, decreased session duration, or increased cart abandonment.

In some embodiments, misconfiguration detection system 130 is configured to detect a condition indicative of sub-optimal WAF configurations by detecting when a rule in the WAF configuration data exposes a web application to malicious network traffic. For example, it may be detected from WAF configuration data that a public-facing load balancer accepts inbound requests directly from the internet, rather than exclusively through a content delivery network (CDN) or a WAF service, thereby permitting malicious requests to bypass upstream inspection. As another example, a WAF configuration may omit enforcement on specific subdomains, API endpoints, ports, a combination thereof, and the like. This omission may result in partial protection of a web application. For instance, traffic directed to "api.example.com" may be excluded from WAF policy application due to an unregistered domain mapping. The misconfiguration detection system 130 is configured to correlate this omission with observed anomalous traffic patterns such as repeated failed login attempts, high request rates from a limited set of network origins, a combination thereof, and the like.

In some embodiments, misconfiguration detection system 130 is configured to detect a condition indicative of sub-optimal WAF configurations by detecting a derelict rule in the WAF configuration data. A derelict rule includes, but is not limited to, duplicate rules, overlapping rules, underutilized rules, and outdated rules.

For example, a duplicate rule may be detected when two or more WAF rules perform identical matching and mitigation actions against the same class of requests, such as two separate SQL injection detection rules that use equivalent pattern logic, but are applied at different policy layers (e.g., one at the cloud WAF layer and another at the edge WAF layer). In such cases, one rule is redundant because both produce identical enforcement outcomes and consume processing resources unnecessarily, increasing latency and management complexity without providing additional protection.

In some embodiments, misconfiguration detection system 130 is configured to detect an overlapping rule by detecting when multiple WAF rules cover intersecting conditions, leading to ambiguity in which rule will execute first, take precedence, and the like. For instance, a global rule may block all traffic containing the keyword "admin," while a narrower rule may permit access to the path "/admin/dashboard" for authenticated users. The broader blocking rule may supersede the narrower one, inadvertently denying legitimate traffic, creating inconsistent enforcement across endpoints, and the like. The misconfiguration detection system 130 is configured to identify this overlap by analyzing, in the structured data store 180, rule scopes and precedence hierarchies to determine conflicts in evaluation order, target coverage, and the like.

In some embodiments, misconfiguration detection system 130 is configured to detect an underutilized rule by detecting when a rule exists in the WAF configuration data but has not been triggered, matched against any network traffic over a defined operational period, and the like. For example, a WAF rule intended to detect deprecated browser versions may never activate because such browsers no longer generate requests to the protected site. This condition may indicate that the rule is unnecessary, misconfigured, applied to the wrong scope, and the like, which leads to consumption of computer resources without providing protective value.

In some embodiments, misconfiguration detection system 130 is configured to transmit, over a user interface, remediation suggestions to effect configuration changes in the network-edge WAF services 140 and the cloud computing WAF services 150. As used herein, remediation suggestions refers to artifacts produced in response to detected conditions that direct modification of WAF configurations. In some embodiments, the remediation suggestions include machine-actionable instructions suitable for automatic execution such as infrastructure-as-code snippets, command sequences, a combination thereof, and the like. In some embodiments, the remediation suggestions may include a description of the assets affected by the sub-optimal WAF configurations, the assets expected to be affected by the configuration changes, the reason for changes, a combination thereof, and the like.

In some embodiments, misconfiguration detection system 130 is configured to receive natural language queries from a client device 120 related to the data in the structured data store 180. Misconfiguration detection system 130 is further configured to generate human-readable responses to the natural language queries.

In some embodiments, misconfiguration detection system 130 is configured to detect a goal of a rule in the WAF configuration data and to identify when the rule is sufficiently misaligned with the detected goal. When the rule is sufficiently misaligned with the detected goal, generating a candidate replacement rule based on the detected goal. The candidate replacement rule serves to replace a rule that is not sufficiently aligned with the detected goal of the rule. The candidate replacement rule is sufficiently aligned with the detected goal of the rule. Misconfiguration detection system 130 is configured to generate a human-readable description of a rationale for the generated candidate replacement rule.

In some embodiments, misconfiguration detection system 130 is configured to detect a goal of a rule in the WAF configuration data and to identify when a name of the rule is below a predetermined threshold of interpretability. When the name of the rule is below the predetermined threshold of interpretability, misconfiguration detection system 130 is configured generate a candidate replacement name for the rule.

It should be noted that the misconfiguration detection system 130 can be realized as a physical machine, or a virtual entity executed of a hardware layer. A virtual entity may include a virtual machine, a software container, a microservice, and the like.

It should be noted that although one misconfiguration detection system 130 is illustrated in FIG. 1 for the sake of simplicity, the embodiments disclosed herein can be applied to a plurality of misconfiguration detection systems 130, a plurality of cross-provider migration system 135, or both. Additionally, clients 120 may be in different geographical locations.

Furthermore, cross-provider migration system 135 is configured to ingest WAF configuration and contextual data from sources such as, but not limited to, network-edge WAF services 140, cloud-native WAF services 150, cyber data source 170, and data store 180 over secure network interfaces. Using this ingested data, cross-provider migration system 135 is configured to derive a provider-agnostic representation of WAF security intent that captures the underlying logic of rules and policies independent of vendor-specific syntax. Cross-provider migration system 135 is configured to correlate this abstracted representation with application topology, traffic behavior, and historical enforcement outcomes to establish a coherent view of how security controls are applied across the customer's networked assets. This abstraction and correlation occur continuously and at scale, allowing cross-provider migration system 135 to track configuration changes, drift, and effectiveness over time across multiple providers and regions.

Cross-provider migration system 135 is further configured to enable cross-provider migration by transforming the provider-agnostic representation into configurations suitable for deployment in a different WAF provider environment. Cross-provider migration system 135 is configured to evaluate the capabilities and constraints of the target WAF provider, determine how abstracted security intent can be expressed using the target provider's native constructs, and prepare translated configurations for controlled deployment. Cross-provider migration system 135 is configured to support network-aware migration workflows, including validation using historical traffic data, staged activation across subsets of network traffic or application assets, and coordinated coexistence of source and target WAF providers during transition periods. These operations reduce the risk of security gaps or service disruption that can arise when protections are moved across network boundaries.

It should be understood that the embodiments described herein are merely exemplary and not intended to be limiting. The arrangement illustrated in FIG. 1 is provided for illustrative purposes only and does not restrict the scope of the disclosed embodiments. Various modifications, adaptations, and alternative configurations may be implemented without departing from the spirit and scope of the disclosed embodiments.

Figure 2:
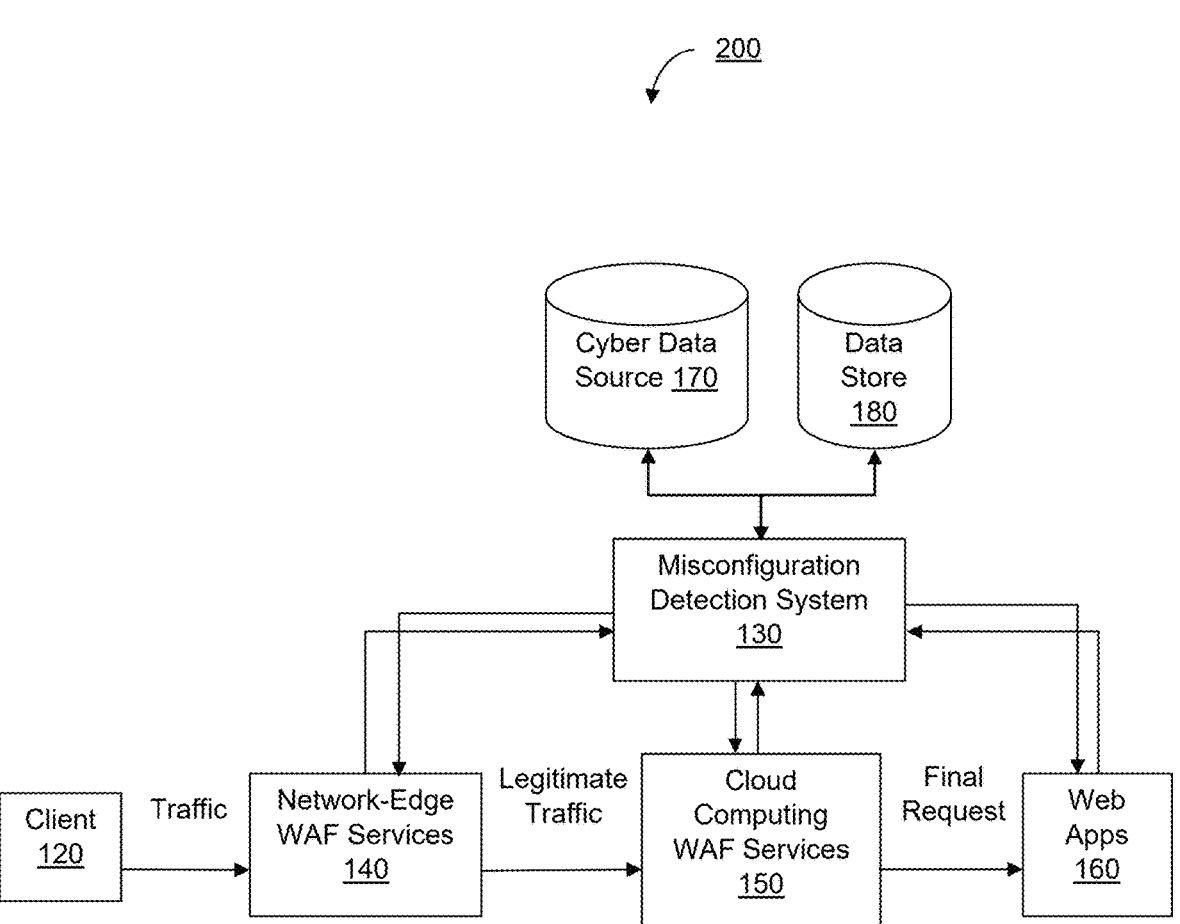
FIG. 2 is a functional diagram illustrating a process for agentless improvement of WAF security posture according to an embodiment.

FIG. 2 is a functional diagram 200 illustrating a process for agentless improvement of WAF security posture according to an embodiment. The process may be performed by the misconfiguration detection system 130.

Clients 120 are configured to initiate requests to web applications 160 through a client-side interface displaying client-side components of web applications 160. Before a final request is received by the web applications 160, the web application traffic is monitored and filtered, according to the rules indicated in the edge WAF data, by network-edge WAF services 140. Network-edge WAF services 140 are configured to filter out, block, and the like web application traffic that is determined as malicious and the like according to the rules indicated in the edge WAF data. Network-edge WAF services 140 configured to pass web application 160 that is determined as legitimate and the like to cloud computing WAF services 150 according to the rules indicated in the edge WAF data.

Cloud computing WAF services 150 are configured to receive web application traffic that is determined as legitimate and the like by network-edge WAF services 140. Cloud computing WAF services 150 are configured to apply rules, as indicated in the cloud WAF data, for managing web application data in a cloud computing environment. After the web application traffic is monitored, filtered, and the like, a final request is sent to the web application 160.

As explained above, misconfiguration detection system 130 is configured to parse WAF configuration data, including edge WAF data from network-edge WAF services 140 and cloud WAF data from cloud computing WAF services 150. Additionally, misconfiguration detection system 130 is configured to normalize the edge WAF data and cloud WAF data into a unified schema and to store the normalized data in data store 180. Further, misconfiguration detection system 130 is configured to enrich the normalized data in the structured data store 180 with web app data including attributes of a web application 160, usage data of a web application 160, threat intelligence data received from cyber data source 170, a combination thereof, and the like.

Additionally, as discussed above, in some embodiments, misconfiguration detection system 130 is configured to detect conditions indicative of sub-optimal WAF configurations based on the correlated relationships among the edge WAF data, cloud WAF data, and the web app data in the structured data store 180. In some embodiments, correlating relationships among the edge WAF data, cloud WAF data, and web app data is performed through queries to the structured data store 180.

In some embodiments, misconfiguration detection system 130 is configured to transmit, over a user interface, remediation suggestions to effect configuration changes in the network-edge WAF services 140 and the cloud computing WAF services 150. In some embodiments, the remediation suggestions may include a description of the assets affected by the sub-optimal WAF configurations, the assets expected to be affected by the configuration changes, the reason for changes, a combination thereof, and the like.

It should also be noted that the configuration of the modules in FIG. 2 is not limited to the configuration demonstrated. In some embodiments, the configuration of the modules of the misconfiguration detection system 130 varies per organization.

Figure 3:
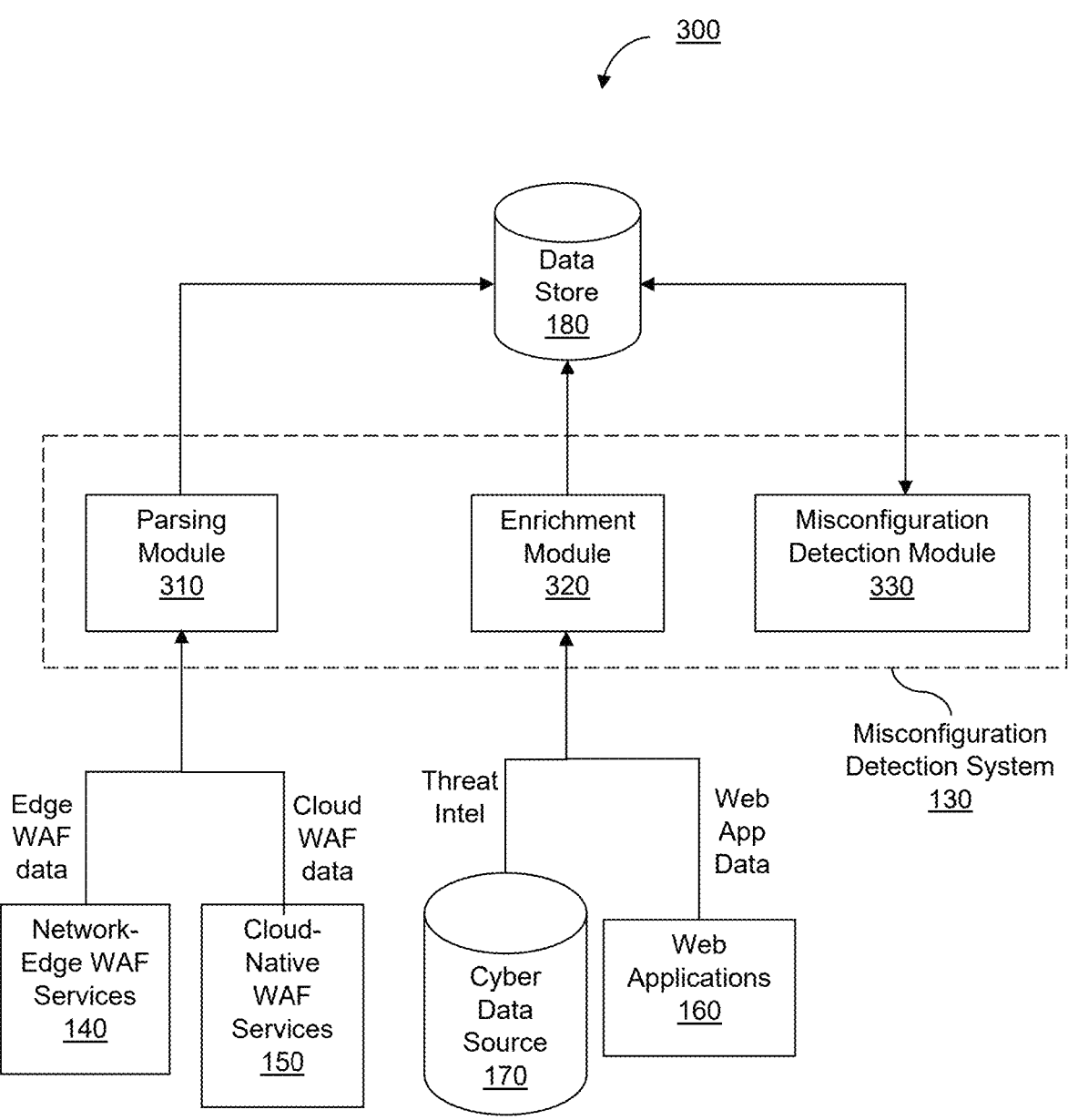
FIG. 3 is a functional diagram of an example process for improving WAF security posture according to an embodiment.

FIG. 3 is a functional diagram 300 of an example process for improving WAF security posture according to an embodiment. In some embodiments, process 300 is performed by misconfiguration detection system 130. misconfiguration detection system 130 is configured to include a parsing module 310, an enrichment module 320, and a misconfiguration detection module 330.

Parsing module 310 is configured to extract WAF configuration data, including edge WAF data and cloud WAF data from network-edge WAF services 140 and cloud computing WAF services 150, respectively. Parsing module 310 is further configured to parse the extracted WAF configuration data and to normalize the WAF configuration data into a unified schema for storage in data store 180, allowing correlations across rules in the WAF configuration data, detection of misconfigurations, a combination thereof, and the like.

Enrichment module 320 is configured to augment web app data to the normalized WAF configuration data included in data store 180 by parsing module 310. It should be noted that the web app data, in some embodiments, is normalized into the unified schema to allow for correlations, detections, and the like. Enrichment module 320 is configured to receive threat intelligence data from cyber data source 170 and is configured to receive web app data from web applications 160. In alternative embodiments, web app data includes threat intelligence data and the like. As mentioned, enriching the normalized WAF configuration data with web app data allows for detection of conditions indicative of a sub-optimal WAF configuration. A more detailed discussion of such detections is provided herein.

Misconfiguration detection module 330 is configured to query data store 180. Misconfiguration detection module 330 is configured to generate and submit queries regarding the normalized, enriched data in the data store 180 so to correlate relationships between the edge WAF data, cloud WAF data, and web app data. Based on the correlated relationships, misconfiguration detection module 330 is configured to detect conditions indicative of a sub-optimal WAF configuration in the WAF configuration data.

Based on the correlated relationships, misconfiguration detection module 330 is configured to detect a conflict between two or more rules indicated by the WAF configuration data. Additionally, misconfiguration detection module 330 is configured to detect when a rule in the WAF configuration data has a user experience impact associated with a web application and to detect when a rule in the WAF configuration data exposes a web application to malicious network traffic. In some embodiments, misconfiguration detection module 330 is configured to detect a derelict rule in the WAF configuration data. A derelict rule includes, but is not limited to, duplicate rules, overlapping rules, under-utilized rules, and outdated rules. Operations of the misconfiguration detection module 330 are discussed in more detail herein.

Misconfiguration detection module 330, in some embodiments, is configured to transmit remediation suggestions (e.g. to a client device 120) that effect a configuration change in the WAF rules of the network-edge WAF services 140 and/or the cloud computing WAF services 150.

In some embodiments, the remediation suggestions may include a description of the assets affected by the sub-optimal WAF configurations, the assets expected to be affected by the configuration changes, the reason for changes, a combination thereof, and the like.

In some embodiments, misconfiguration detection module 330 is configured to detect prevention opportunities. In some embodiments, prevention opportunities are detected by analyzing correlations among the edge WAF data, cloud WAF data, and web application data to identify configuration parameters that, if adjusted, would proactively reduce exposure to potential security threats before they occur. The analysis of correlations to detect prevention opportunities may include predictive identification of rules, settings, and the like in the WAF configuration data indicative of emerging vulnerabilities (e.g. potential attack vectors) that could lead to security incidents. Based on the correlations involved in detecting prevention opportunities, misconfiguration detection module 330 is configured to modify WAF configurations such that the modification proactively reduces exposure to potential security threats prior to occurrence.

In some embodiments, misconfiguration detection module 330 is configured to cause execution of mitigation actions. Causing execution of mitigation actions may include detecting a risk associated with the conditions indicative of the sub-optimal WAF configuration and generating configuration recommendations that reduce the impact of the detected risk (e.g. likelihood of the risk, severity of the risk, and the like) while preserving web application performance and availability. The mitigation actions may include, but are not limited to, modifying rule priorities, adjusting threshold values, reconciling conflicting WAF policies across edge and cloud environments, and the like to lessen the potential impact of risks that are recurring, ongoing, and the like.

In some embodiments, misconfiguration detection system 130 is configured to receive natural language queries from a client device 120 related to the data in the structured data store 180. Misconfiguration detection system 130 is further configured to generate human-readable responses to the natural language queries.

In some embodiments, misconfiguration detection system 130 is configured to detect a goal of a rule in the WAF configuration data and to identify when the rule is sufficiently misaligned with the detected goal. When the rule is sufficiently misaligned with the detected goal, generating a candidate replacement rule based on the detected goal. The candidate replacement rule serves to replace a rule that is not sufficiently aligned with the detected goal of the rule. The candidate replacement rule is sufficiently aligned with the detected goal of the rule. The misconfiguration detection system 130 is configured to generate a human-readable description of a rationale for the generated candidate replacement rule.

In some embodiments, misconfiguration detection system 130 is configured to detect a goal of a rule in the WAF configuration data and to identify when a name of the rule is below a predetermined threshold of interpretability. When the name of the rule is below the predetermined threshold of interpretability, misconfiguration detection system 130 is configured to generate a candidate replacement name for the rule.

It should be noted that the misconfiguration detection system 130 can be realized as a physical machine, or a virtual entity executed on a hardware layer. A virtual entity may include a virtual machine, a software container, a microservice, and the like.

It should be noted that although one misconfiguration detection system 130 is illustrated in FIG. 3 for the sake of simplicity, the embodiments disclosed herein can be applied to a plurality of misconfiguration detection systems 130. Additionally, clients 120 may be in different geographical locations.

It should also be noted that the configuration of the modules in FIG. 3 is not limited to the configuration demonstrated. It should also be understood that any "module" discussed herein may be implemented in various forms. Specifically, a module can be implemented in hardware, software, firmware, or any combination thereof, unless explicitly stated otherwise. The exact form of implementation may depend on design constraints, performance considerations, and application-specific requirements. The term "hardware" refers to one or more physical computing devices or components capable of performing operations, including model training, inference, and/or data processing. Non-limiting examples of hardware include are provided above. The described embodiments are not limited to any particular implementation platform and may be deployed across heterogeneous environments comprising combinations of the above.

Figure 4:
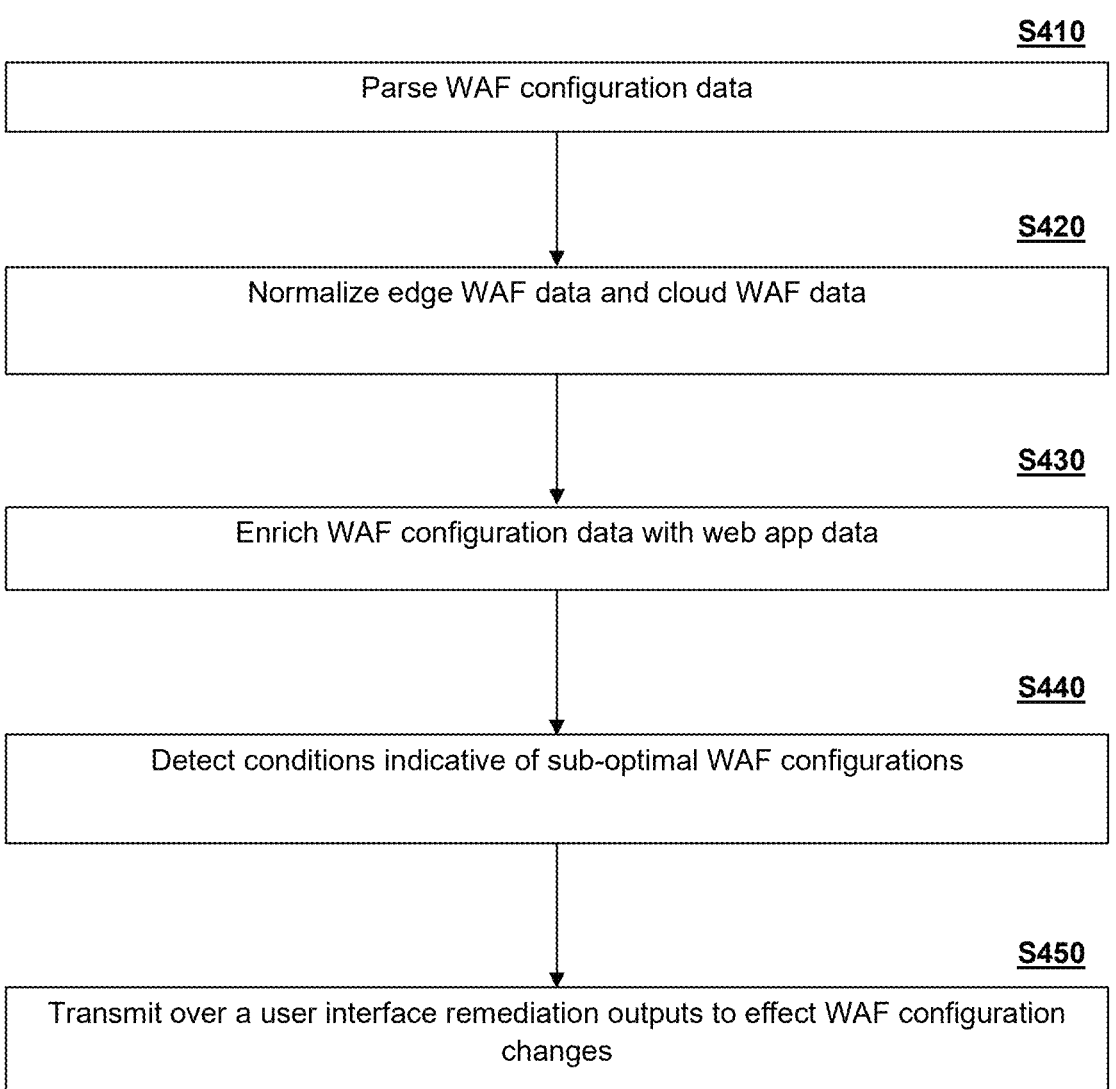
FIG. 4 shows an example flowchart illustrating a process for improving WAF security posture according to an embodiment.

FIG. 4 shows an example flowchart 400 illustrating a process for improving WAF security posture according to an embodiment. In some embodiments, the process is performed by misconfiguration detection system 130.

At S410, WAF configuration data is parsed. As explained above, WAF configuration data includes, but is not limited to, edge WAF data and cloud WAF data. Parsing WAF configuration data includes At S420, edge WAF data and cloud WAF data are normalized. Edge WAF data and cloud WAF data are formatted differently across different vendors of WAF-related services. Normalizing WAF data serves to transform the differently formatted data into a unified schema in a structured data store that is configured to be queried, allowing for correlation of relationships between the stored, normalized WAF data.

At S430, WAF configuration data is enriched with web app data. In some embodiments, enriching the WAF configuration data with web app data includes receiving web app data related to attributes, usage, and threat intelligence of web applications. In some embodiments, the web app data is normalized into the unified schema (e.g., the same or similar schema as the WAF configuration data). Normalized web app data is augmented to the normalized WAF configuration data in the data store, enabling correlations of relationships between the WAF configuration data and web app data such that it can be detected when, in general or for a particular web application, WAF configurations are suboptimal.

At S440, conditions indicative of sub-optimal WAF configurations are detected. In some embodiments, detecting conditions indicative of sub-optimal WAF configurations is performed by querying edge WAF data, cloud WAF data, and web app data to detect such conditions. A sub-optimal WAF configuration is defined as any WAF configuration, shown in the structured data store, that interferes with optimal performance of the WAF services and/or interferes with an intended function of the web application subject to the WAF services. Examples of conditions indicative of a sub-optimal configurations are discussed herein.

For example, a sub-optimal WAF configuration may be indicated by a conflict between two or more rules indicated by the WAF configuration data. For example, as mentioned herein, the definition of one rule shown in the edge WAF data and the definition of another rule in the cloud WAF data may be in conflict. Furthermore, as explained herein, a sub-optimal configuration may be indicated when a rule in the WAF configuration data has a user experience impact, as defined hereinabove, associated with a web application. Additionally, as explained herein, a sub-optimal configuration may be indicated when a rule in the WAF configuration data exposes a web application to malicious network traffic. In addition, a sub-optimal configuration may be indicated by a derelict rule in the WAF configuration data. A derelict rule includes, but is not limited to, duplicate rules, overlapping rules, underutilized rules, and outdated rules, as discussed hereinabove.

At S450, remediation suggestions are transmitted, over a user interface, to effect WAF configuration changes. In some embodiments, the remediation suggestions may include a description of the assets affected by the sub-optimal WAF configurations, the assets expected to be affected by the configuration changes, the reason for changes, a combination thereof, and the like.

In some embodiments, natural language queries may be received from a client device related to the data in the structured data store, and human-readable responses to the natural language queries may be generated. This allows the user to understand the WAF configuration data and to execute natural language queries related to the WAF configuration data.

In some embodiments, a goal of a rule in the WAF configuration data is identified. Additionally, it is identified when the rule is sufficiently misaligned with the detected goal. When the rule is sufficiently misaligned with the detected goal, a candidate replacement rule is generated based on the detected goal. The candidate replacement rule serves to replace a rule that is not sufficiently aligned with the detected goal of the rule. The candidate replacement rule is sufficiently aligned with the detected goal of the rule. In some embodiments, a human-readable description of a rationale for the generated candidate replacement rule is generated.

For example, a rule that challenges requests with a CAPTCHA on a product page may be determined to have the goal of deterring automated scraping while minimizing friction for human shoppers. When telemetry shows elevated bounce rate and low bot detection efficacy, the rule may be identified are sufficiently misaligned with its detected goal.

In some embodiments, a goal of a rule in the WAF configuration data is identified. Further, it is identified when a name of the rule is below a predetermined threshold of interpretability. Interpretability refers to a level at which the goal of the rule is interpretable based on the name of the rule. When the name of the rule is below the predetermined threshold of interpretability, a candidate replacement name for the rule is generated.

In some embodiments, effecting a configuration change (e.g., deploying a candidate replacement rule) includes defining the new configuration's intent, scope, and priority relative to existing controls, and expressing it in a neutral, provider-agnostic format. The proposed configuration change is then validated against the current configuration by checking coverage, precedence, and safety constraints. The configuration change may be deployed in a non-disruptive evaluation state that records matches without enforcing, allowing comparison between current and proposed outcomes and confirming that the new logic of the configuration change does not create gaps, increases false positives for legitimate traffic, a combination thereof, and the like. When evaluation results meet predefined acceptance criteria, the deployment of the configuration change proceeds by activating enforcement of the configuration change for a bounded subset of web application traffic or assets while monitoring security signals (e.g., attack detections) and experience signals (e.g., error rates, abandonment, latency). If enforcement of the configuration change aligns with expectations, enforcement is promoted to full scope and the superseded rule is disabled.

In some embodiments, prevention opportunities are detected. Prevention opportunities are detected by analyzing correlations among the edge WAF data, cloud WAF data, and web application data to identify configuration parameters that, if adjusted, would proactively reduce exposure to potential security threats before they occur. The analysis of correlations to detect prevention opportunities may include predictive identification of rules, settings, and the like in the WAF configuration data indicative of emerging vulnerabilities that could lead to security incidents. Based on the correlations involved in detecting prevention opportunities, the WAF configurations are modified such that the modification proactively reduces exposure to potential security threats prior to occurrence.

In some embodiments, mitigation actions are executed. Executing mitigation actions may include detecting a risk associated with the conditions indicative of the sub-optimal WAF configuration and generating configuration recommendations that reduce the impact of the detected risk (e.g. likelihood of the risk, severity of the risk, and the like) while preserving web application performance and availability. The mitigation actions may include, but are not limited to, modifying rule priorities, adjusting threshold values, reconciling conflicting WAF policies across edge and cloud environments, and the like to lessen the potential impact of risks that are recurring, ongoing, and the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
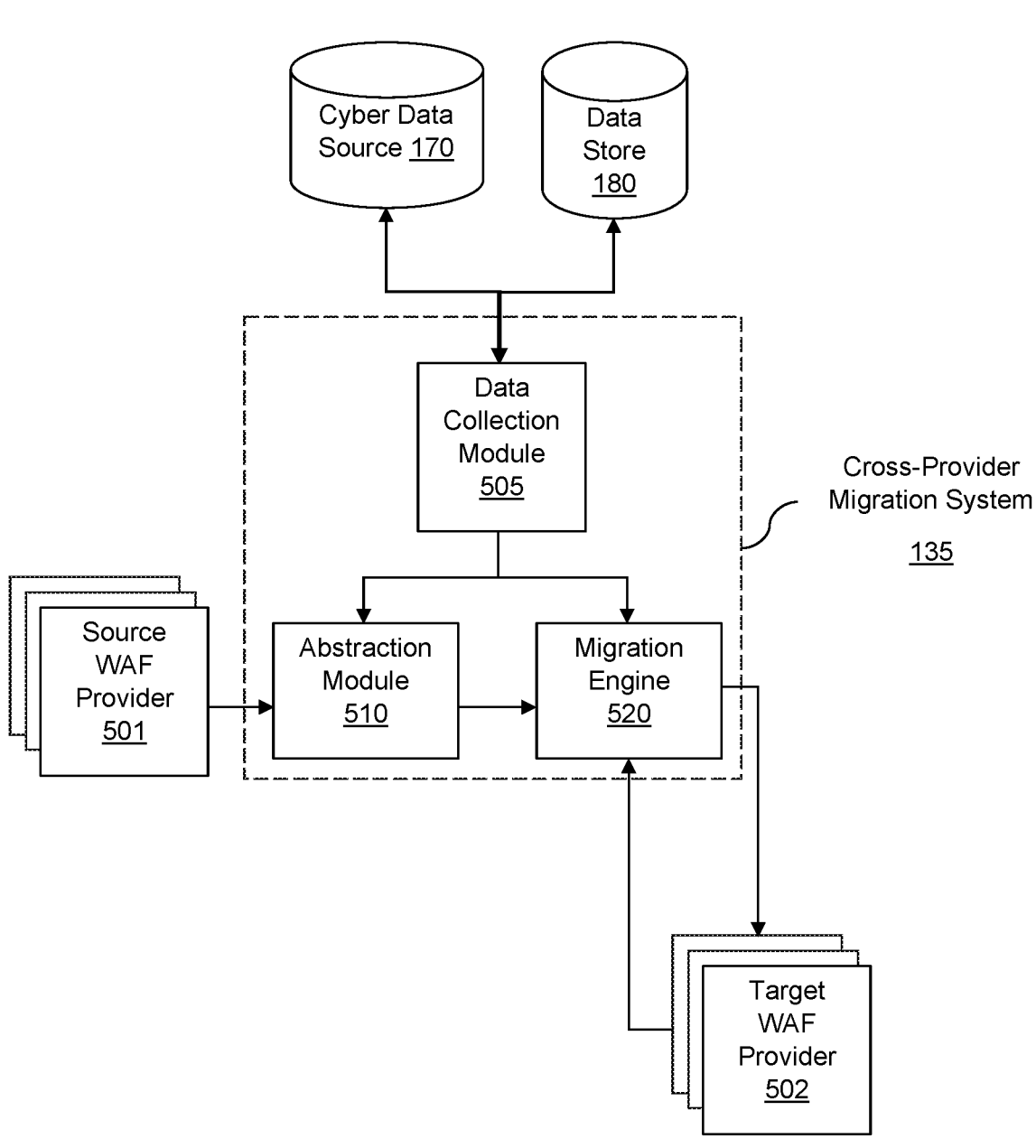
FIG. 5 is a functional block diagram illustrating an example cross-provider migration system configured to collect, abstract, analyze, correlate, and migrate WAF configuration data across heterogeneous WAF provider environment according to an embodiment.

FIG. 5 is a functional block diagram 500 illustrating an example cross-provider migration system configured to collect, abstract, analyze, correlate, and migrate WAF configuration data across heterogeneous WAF provider environment according to an embodiment.

In the illustrated embodiment, cross-provider migration system 135 includes a data collection module 505, an abstraction engine 510, and a migration engine 520 that operate as a centralized control plane for vendor-agnostic WAF management and migration.

In some embodiments, cross-provider migration system 135 is communicatively coupled to one or more source WAF provider environments 501 (hereinafter, "source WAF provider environment," or "source WAF provider") and one or more target WAF provider environments 502 (hereinafter, "target WAF provider environment," or "target WAF provider"), as well as to auxiliary systems including traffic log repositories, cloud infrastructure metadata services, and external intelligence sources (e.g., cyber data source 170 and data store 180, FIG. 1). In the example functional diagram 500, a customer operates one or more web applications protected by a source WAF provider 501 and seeks to transition protection to a target WAF provider 502.

Data collection module 505 is configured to ingest raw data, including, but not limited to, machine-scale configuration and telemetry data generated by distributed WAF and CDN services operating across multiple regions, accounts, and application assets. In some embodiments, data collection module 505 is configured to collect WAF configuration data including complete rule structures, rule groups, policy hierarchies, conditions, actions, priorities, exclusions, evaluation modes, tags, version metadata, a combination thereof, and the like. The collected WAF configuration data may correspond to provider-specific constructs such as Web ACLs, firewall configurations, security policies, or rule sets, depending on the source provider.

In addition to WAF configuration data, data collection module 505 is configured to ingest infrastructure context associated with protected web applications, including cloud resources (e.g., load balancers, gateways, content distribution endpoints), network topology (e.g., DNS records, certificate mappings), traffic routing patterns, a combination thereof, and the like. Data collection module 505 is further configured to ingest traffic logs and enforcement telemetry, such as request logs, blocked and allowed traffic records, rate-limit counters, and anomaly signals.

In some embodiments, data collection module 505 also ingests external intelligence and enrichment data, including open-source intelligence, internet scanning results, certificate transparency logs, and application fingerprinting outputs that identify exposed endpoints and technology stacks. Data collection may be performed via API-based ingestion using provider-specific credentials and least-privilege tokens, exporter services built on provider SDKs, and batch or streaming pipelines for log ingestion. Raw vendor responses may be preserved for traceability, while normalized and enriched records are stored in a structured data store and continuously updated using delta tracking at enterprise scale In some embodiments, data collection module 505 is further configured to ingest external intelligence and enrichment data, including open-source intelligence sources, internet scan data, certificate transparency logs, application fingerprinting results, a combination thereof, and the like. Such enrichment data may be used to identify exposed endpoints, infer application technologies, and contextualize WAF rules relative to business logic and attack surface.

Data collection module 505 is further configured to employ multiple ingestion mechanisms, including API-based collection using provider-specific credentials, cross-account roles, tokens with least-privilege scopes, and the like; exporter services using provider SDKs; ingestion pipelines for logs and metadata; a combination thereof; and the like. In some embodiments, raw vendor responses are preserved in vendor-specific storage structures, while normalized and enriched records are stored in a structured data store for downstream processing. Data collection module 505 is configured to operate continuously at scale, supporting enterprise environments with tens of thousands of endpoints and ongoing delta tracking.

Abstraction engine 510 is configured to receive data collected by data collection module 505 and to generate a provider-agnostic representation that captures the underlying security intent and semantics of WAF configurations. Data collected by data collection module 505 enables provider-agnostic abstraction by the abstraction module 510 because WAF services fundamentally operate on common, universal properties of web traffic regardless of vendor implementation. Specifically, WAFs across platforms inspect the same underlying HTTP and HTTPS components, including request headers, request bodies, query parameters, POST data, cookies, and URL paths. As a result, although WAF providers expose different configuration syntaxes and control surfaces, the inspected traffic elements are semantically identical across platforms.

Accordingly, abstraction engine 510 is configured to leverage the universality of HTTP semantics and common attack patterns to abstract vendor-specific configurations into a unified, provider-agnostic representation. In some embodiments, the abstraction engine 510 is configured to rely on shared semantic foundation to infer that different provider-specific rules are logically equivalent protections. This enables consistent abstraction, comparison, and migration even when providers differ in syntax, feature exposure, or configuration hierarchy.

Abstraction engine 510 is configured to parse vendor-specific formats and normalize the formats into a unified internal language using a cross-platform semantic mapping system that associates universal security concepts with vendor-specific constructs.

In some embodiments, abstraction 510 is configured to generate a provider-agnostic language representation (unified language representation) of a WAF rule by encoding parsed logic, conditions, match fields, actions, and the like of the WAF rule into a vectorized representation (e.g., using the trained cross-provider semantic similarity model) that transforms rule structures into numerical feature vectors; computing (e.g., by the trained cross-provider semantic similarity model) semantic similarity scores between the vectorized representation of the WAF rule and a plurality of predefined universal security intent representations corresponding to common web application protection objectives; and selecting, based on the computed semantic similarity scores satisfying a predetermined similarity threshold, a normalized security intent definition that represents an underlying security objective of the source WAF rule independently of vendor-specific syntax.

An example of the unified internal language that associates universal security concepts with vendor-specific constructs is shown below:

| Universal Term | WAF #1 | WAF #2 | WAF #3 | WAF #4 | WAF #5 |
|---|---|---|---|---|---|
| Policy Container | Web ACL | Firewall | Security Policy | Policy | Security Policy |
| Rule Group | Rule Group | Rule List | Rule Set | Rule Set | Rule |
| String Match Types | ByteMatch | Contains/ Equals | CONTAINS/ EQ | Contains/ Equals | contains/ eq |

The provider-agnostic representation generated by abstraction engine 510 captures rule logic, match criteria, actions, scope, precedence, dependencies, and the like independently of any specific WAF provider. In some embodiments, abstraction engine 510 is configured to generate explainable descriptions of rules and policies, including human-readable summaries of purpose and effect. For example, where a WAF rule is expressed as a complex set of nested conditions across multiple objects, abstraction module 510 is configured to output an explainable description such as: "Challenge requests to/login when the request rate per IP exceeds a threshold and the user-agent is anomalous," along with a structured, provider-agnostic representation of the same logic. In some embodiments, abstraction module 510 is configured to employ artificial intelligence (AI) and machine learning (ML) techniques, including, but not limited to, natural language processing (NLP) models and large language models (LLMs), to derive an explainable description of WAF rules, policies, and configurations.

In some embodiments, abstraction module 510 is further configured to infer the goal of a rule and the like of the WAF configuration data when the representation of the rule in the source WAF provider 501 is verbose, fragmented, not readily interpretable, a combination thereof, or the like. This is particularly useful when rules have non-descriptive names, rely on large lists, are the product of incremental edits that obscure intent, a combination thereof, or the like. For instance, a customer may have implemented a "country block" indirectly by enumerating thousands of IP addresses associated with a region. Abstraction module 510, in this example, is configured to infer that the underlying goal is geographic restriction and to represent the rule as "block traffic originating from a specified country/region," rather than preserving the enumerated list as the primary semantics. In some embodiments, abstraction module 510 is configured to employ artificial intelligence (AI) and machine learning (ML) techniques, including natural language processing (NLP) models and large language models (LLMs), to infer the goal of a rule (e.g., bot mitigation, geo restriction, rate limiting, application-layer attack prevention) and identify ambiguities or inconsistencies between the inferred goal and the observed logic, enabling the system to flag misaligned or sub-optimal configurations during abstraction.

In some embodiments, abstraction engine 510 is further configured to enrich the provider-agnostic representation with organizational context derived from infrastructure metadata, traffic patterns, signals, and the like. In some embodiments, abstraction module 510 is configured to implement a heuristic method to clusterweb applications and the like into logical application groupings using various weighted signals from the organizational context. Some signals may include root-domain affinity, infrastructure tags, TLS certificate overlap, shared traffic characteristics. Root-domain affinity may group related sub-domains (e.g., news-.com.au, auth.news.com.au). Infrastructure tags include AWS® tags, Cloudflare® zones, and project identifiers. TLS certificate overlap may indicate one web application. Traffic patterns may indicate similar WAF policies and traffic volumes. Each signal has a weight, and when the clustered weighted signals yield a weighted score (e.g., a composite correlation score) above a predetermined threshold, separate signals are merged and treated as one web application.

In some embodiments, abstraction engine 510 is further configured to generate interactive visualizations and unified dashboards that present the provider-agnostic representation in a manner that is intuitive, navigable, and actionable for users. These visualizations are derived from the normalized and enriched abstraction data and are independent of the underlying WAF provider.

In one embodiment, abstraction engine 510 is configured to generate an interactive graph view that illustrates relationships between protected assets and security controls. For example, the graph view may depict a hierarchical or linked relationship mapping from Domain to Host to Endpoint to WAF Policy, enabling users to visually explore which policies protect which application components and where gaps or overlaps exist. Nodes and edges in the graph may be interactive, allowing users to view specific rules, view explainable descriptions, trace how traffic flows through multiple layers of protection, and the like.

In another embodiment, abstraction engine 510 is configured to generate hierarchical visualizations such as sunburst charts or treemaps that organize WAF configurations by business unit, cloud account, region, application, or provider. These visualizations may allow users to quickly assess the distribution of protections across organizational boundaries, identify concentrations of risk, compare coverage across environments, and the like.

In some embodiments, abstraction engine 510 is configured to generate coverage metrics and real-time dashboards that quantify protection gaps and rule effectiveness. Such dashboards may display metrics such as the percentage of endpoints protected by specific control categories, the number of rules with zero hits, false-positive indicators, or enforcement coverage by attack class. Because the metrics are derived from the provider-agnostic representation, they are normalized and consistent regardless of the underlying WAF provider.

In further embodiments, abstraction engine 510 is configured to provide dashboard features that support cross-vendor analysis and migration planning. These features may include side-by-side comparison of equivalent protections implemented across different WAF providers, allowing users to see how a given security goal is expressed and enforced in each environment. Normalized metrics may be used to present consistent key performance indicators (KPIs), such as rule effectiveness or coverage completeness, independent of provider-specific reporting formats. Additionally, abstraction engine 510 is configured to compute migration readiness scores that assess how easily particular policies or applications can be transferred to target WAF provider 502, based on feature compatibility, rule complexity, and dependency analysis.

In some embodiments, abstraction engine 510 is configured to support structured and natural-language-like queries over the unified representation. Example queries may include "coverage:missing control:WAF", which returns a list of assets or endpoints lacking WAF protection, or "tag:prod sort:cloud", which displays production applications grouped by cloud provider. In some embodiments, abstraction engine 510 is further configured to support custom risk scoring queries that combine security exposure with business metadata, such as revenue impact, application criticality and the like, enabling prioritization of migration efforts, remediation efforts, and the like.

Migration engine 520 is configured to execute a structured, multi-phase migration process that transforms the provider-agnostic representation produced by abstraction engine 510 into a configuration suitable for deployment in target WAF provider 502. Migration engine 520 is configured to perform semantic translation, validation, and deployment planning based on knowledge of both source WAF provider 501 and target WAF provider as well as the organizational context of a tenant organization.

In a first phase of the multi-phase migration process, migration engine 520 is configured to extract rules, policies, dependencies, actions, and the like of a source WAF provider and normalize such rules and the like into the provider-agnostic language representation (unified internal language). This first phase further includes contextual enhancements such as application topology, observed traffic behavior, and business logic context. At the first phase, migration engine 520 is configured to produces a migration-ready representation of an organization's security posture that reflects both the abstracted intent and the operational context of the protected web application assets.

In a second phase, migration engine 520 is configured to perform target platform translation. Migration engine 520 is configured to generate a capability model of the target WAF provider 502 that represents the WAF features native to the target WAF provider 502 including, but not limited to, feature sets, limitations, native formats, service tiers, and the like of the target WAF provider 502 and to map a provider-agnostic representation of a source WAF rule of the source WAF provider 501 to the target WAF provider 502 based on the detected capabilities. In the second phase, migration engine 520 is configured to generate, based on the provider-agnostic representation, a rule or the like in a format that is compatible with the capability model of the target WAF provider 502. In some embodiments, migration engine 520 is configured to generate target-provider-native rule definitions, expressions, lists, and policy structures that implement the abstracted intent using the syntax and semantics supported by the target WAF provider 502.

For example, an implementation of a WAF rule in a source WAF provider 501 may be:

```
{
    "Name": "SQLi-QueryString-Protection",
    "Priority": 10, "
    "Action": {"Block": { },
    "Statement": {
        "SqliMatchStatement": {
            "FieldToMatch": {"QueryString": { },
            "SensitivityLevel": "HIGH"
        }
    }
}
```

The unified, provider-agnostic representation, based on the above implementation, may be:

Purpose: Block SQL injection attempts in query parameters

Conditions: Detect SQL injection patterns in URL query strings

Action: Block the request

Logging: Log the event with high severity

The translated implementation of the WAF rule suitable for the target WAF provider 502 may be:

```
{
    "name": "SQLi-QueryString-Protection",
    "priority": 10,"
    "ruleType": "MatchRule",
    "action": "Block",
    "matchConditions": [{
        "matchVariables": [{"variableName": "Que-
            ryString"}],
        "operator": {"DetectSqli"
    }]
}
```

In some embodiments, migration module 520 is configured to generate alternate implementations of the provider-agnostic representation of a rule or the like where native equivalents do not exist. For example, where the abstracted rule goal is "block traffic from China," and the target WAF provider 502 supports native geo controls, translation engine 520 is configured to generate a geo-match control. Conversely, where the target WAF provider 502 does not support geo controls, translation engine 520 is configured to generate an alternate implementation using IP lists or other constructs (e.g., a maintained list derived from geo-IP mappings). In another example, where the WAF configuration data of the source WAF provider 501 uses a provider-specific managed rule set, translation engine 520 is configured to select the most similar managed rule set available in the target WAF provider 502 (or a combination of target rules) and record a similarity ranking, confidence level, or the like for the selection. In some embodiments, translation engine 520 is further configured to incorporate WAF provider tier constraints (e.g., a WAF feature requiring a specific service plan) and generate recommendations, conditional outputs, and the like such as: "Feature available only on premium tier; otherwise use an alternate rule composition."

During the second phase, in some embodiments, migration engine 520 is configured to simplify rule logic while preserving intent, such as collapsing verbose enumerations into higher-level constructs, removing unreachable conditions, consolidating overlapping rules, omitting ineffective controls, and the like. In some embodiments, migration engine 520 is configured to detect a security intent of the source WAF rule based on the provider-agnostic language representation; determine (e.g., using the capability model of the target WAF provider) when the security intent can be implemented in the target WAF rule with reduced complexity from the source WAF rule; and generate a reduced-complexity target WAF rule for the target WAF provider. Migration engine 520 is further configured to assign confidence scores to translations and identify cases requiring additional review due to feature gaps or approximations. For example, rather than translating a source rule that blocks each of many IP addresses individually (intended to represent a country block), translation engine 520 is configured to output a single target-provider rule that blocks the country directly. As another example, where a source rule attempts to implement a rate limit through multiple overlapping conditions, translation engine 520 is configured to generate a single rate-limit control in the target provider 502 that expresses the intent of the source rule. In some embodiments, translation engine 520 is configured to omit translation of controls from the source WAF provider 501 that are identified as derelict, ineffective (e.g., rules with no hits) and the like, thereby avoiding migration of such rules into the target WAF provider 502.

In some embodiments, migration engine 520 is configured to utilize AI/ML techniques. In some embodiments, migration engine is configured to generate a candidate WAF rule for deployment in the target WAF provider based on the provider-agnostic language representation of the source WAF rule and the capability model of the target WAF provider; generate a first vector representation, in a vector database, of the provider-agnostic language representation of the source WAF rule; generate a candidate vector representation, in the vector database, of the candidate WAF rule; compute a distance in the vector database between the first vector representation and the candidate vector representation; and determine the candidate WAF rule as the target WAF rule when the computed distance is below a predetermined distance threshold.

In some embodiments, an LLM is used to synthesize target-provider rule expressions from the provider-agnostic representation, taking into account the target provider's syntax, supported features, and constraints. The LLM-generated output may then be validated or constrained by deterministic rules and vendor capability mappings to ensure correctness and safety prior to deployment. In some embodiments, AI/ML models learn from prior migrations and post-deployment telemetry to improve future translations, such as by adjusting confidence scores, recommending simplifications that have historically reduced false positives, or identifying translation patterns that best preserve enforcement behavior across providers.

In a third phase, migration engine 520 is configured to coordinate validation and deployment planning. The third phase includes performing impact analysis to assess the effect of translated rules on legitimate traffic, leveraging historical logs and machine-learning-assisted analysis. In some embodiments, migration engine 520 is configured to prepare rules for deployment in evaluation modes, define phased rollout strategies, establish rollback conditions, and the like. This phase ensures that translated configurations can be safely introduced into the target WAF provider environment without introducing gaps, excessive false positives, service disruption, or the like. Staged activation may include first enforcing the translated configuration for a bounded subset of traffic or assets (e.g., a particular hostname, path group, region, or percentage of requests), during which time security signals (e.g., attack detections, blocked/challenged events) and the like are monitored.

In some embodiments, migration module 520 is configured to coordinate a transition period in which both the source WAF provider 501 and the target WAF provider 502 are active for different segments of traffic, reducing exposure during "limbo" states that can occur when teams lose focus on the source WAF provider 501 before the target WAF provider 502 is fully configured. For example, during an ongoing WAF provider migration, vulnerabilities may arise in the source WAF provider 501 due to neglected updates while the migration to target WAF provider 502 is still incomplete. In such cases, migration module 520 is configured to mitigate potential vulnerabilities by maintaining visibility into both environments, sequencing deployments, and ensuring that critical protections are not disabled prematurely.

Migration module 520 is further configured to apply the suitable translated WAF configuration data produced to the target WAF provider 502 and, in some embodiments, to coordinate a controlled transition from the source WAF provider 501 to the target WAF provider 502. Migration module 520 is configured to deploy translated rules/policies via one or more mechanisms including provider APIs, configuration imports, infrastructure-as-code pipelines, administrative automation, a combination thereof, and the like.

In some embodiments, the modules of cross-provider migration system 135 are configured to operate iteratively, cooperatively, a combination thereof, and the like. Abstraction module 510 is configured to continually ingest updated WAF configuration data from the source WAF provider 501 and update the provider-agnostic representation to reflect changes to the WAF configuration data over time. Migration engine 520 is configured to regenerate translated outputs responsive to such changes and to capability updates of the target WAF provider 502. Migration module 520 is configured to apply incremental changes to the target WAF provider 502 to keep the migration aligned with the evolving configuration of the source WAF provider 501. Additionally, in some embodiments, the explainable descriptions generated by abstraction module 510 and the simplification decisions made by migration engine 520 are transmitted to an operator as reviewable artifacts, enabling a human-in-the-loop workflow in which the customer approves specific translations, overrides certain mappings, elects to exclude low-value rules from migration, and the like.

It should be noted that although one cross-provider migration system 135 is illustrated in FIG. 5 for the sake of simplicity, the embodiments disclosed herein can be applied to a plurality of cross-provider migration systems 135. Additionally, clients 120 may be in different geographical locations.

It should also be noted that the configuration of the modules in FIG. 5 is not limited to the configuration demonstrated. It should also be understood that any "module" or "engine" discussed herein may be implemented in various forms. Specifically, a module or engine can be implemented in hardware, software, firmware, or any combination thereof, unless explicitly stated otherwise. The exact form of implementation may depend on design constraints, performance considerations, and application-specific requirements. The term "hardware" refers to one or more physical computing devices or components capable of performing operations, including model training, inference, and/or data processing. Non-limiting examples of hardware include are provided above. The described embodiments are not limited to any particular implementation platform and may be deployed across heterogeneous environments comprising combinations of the above.

FIG. 6 is an example flowchart 600 illustrating a process for migrating WAF configuration data across different WAF providers according to an embodiment. In some embodiments, the process is performed by a cross-provider migration system (e.g., cross-provider migration system 135) executing on one or more processors and coupled to a structured data store that stores WAF configuration data, normalized WAF configuration data, and related metadata.

At S610, WAF rules from multiple WAF providers are parsed. The WAF rules are expressed in varying provider-specific formats.

In this step, WAF rule configurations are programmatically retrieved from multiple heterogeneous WAF provider environments using automated interfaces such as application programming interfaces (APIs), configuration exporters, or infrastructure-as-code pipelines. The parsed rules may include provider-specific constructs such as, but not limited to, WAF rules, policies, rule groups, managed rule sets, custom rules, rate-limit controls, geo controls, lists (e.g., allowlists/denylists), exceptions, priorities, actions (e.g., allow, block, challenge, log), deployment scope (e.g., per-domain, per-application, per-path, per-hostname), a combination thereof, and the like.

In some embodiments, parsing operation converts the provider-specific representations into machine-readable intermediate structures, such as abstract syntax trees or rule graphs, suitable for downstream automated processing.

At S620, a source WAF rule of a source WAF provider is enriched with organizational context derived from multiple signals from a tenant computing environment.

The organizational context provides situational awareness beyond the isolated rule definition and may include domain relationships, infrastructure metadata, certificate associations, traffic characteristics, business logic flows, and protected application assets associated with the tenant. This enrichment enables the source WAF rule to be evaluated relative to the applications, endpoints, and business functions it protects rather than as a standalone configuration artifact.

In some embodiments, enriching the source WAF rule includes analyzing the multiple signals including domain relationships, infrastructure metadata, certificate associations, and traffic characteristics; clustering a plurality of web application assets of the tenant into logical application groupings; and associating the source WAF rule with at least one clustered web application asset.

In some embodiments, clustering the plurality of web application assets includes assigning weights to the multiple signals, computing a composite correlation score for a pair of web application assets, and merging the pair of web application assets into a common cluster when the composite correlation score exceeds a predetermined threshold.

At S630, a provider-agnostic language representation of the source WAF rule is generated. In some embodiments, the provider-agnostic language representation is generated using a trained cross-provider semantic similarity model (cross-provider migration system 135, FIG. 1) and is based on the provider-specific format of the source WAF rule and the organizational context.

In some embodiments, the trained cross-provider semantic similarity model is configured to abstract vendor-specific syntax into a normalized representation that captures the underlying security intent and logic of the source WAF rule independently of the source provider's configuration language. The abstraction enables consistent reasoning, comparison, and migration across heterogeneous WAF platforms.

In some embodiments, generating the provider-agnostic language representation includes encoding parsed logic, conditions, match fields, and actions of the source WAF rule into a vectorized representation using the trained cross-provider semantic similarity model; computing semantic similarity scores between the vectorized representation of the source WAF rule and predefined universal security intent representations corresponding to common web application protection objectives; and selecting, based on the computed semantic similarity scores satisfying a predetermined similarity threshold, a normalized security intent definition that represents an underlying security objective of the source WAF rule independently of vendor-specific syntax.

At S640, a capability model of a target WAF provider is constructed, including at least rule types, features, and constraints supported by the target WAF provider.

The capability model represents the technical capabilities and limitations of the target WAF provider, such as supported match operators, rate-limiting constructs, managed rule sets, enforcement actions, service-tier restrictions, and syntax constraints. This model is used to ensure that translated rules are compatible with the target provider's native functionality and deployment requirements.

At S650, a target WAF rule for deployment in the target WAF provider is generated. In some embodiments, the target WAF rule is generated using the trained cross-provider semantic similarity model (cross-provider migration system 135, FIG. 1) and is based on the provider-agnostic language representation of the source WAF rule and compatible with the capability model of the target WAF provider.

The generation process transforms the abstracted security intent into one or more target-provider-native rule constructs that preserve enforcement semantics while conforming to the syntax and features of the target WAF provider.

In some embodiments, generating a target WAF rule involves to the use of AI/ML techniques. In some embodiments, generating the target WAF rule further comprises generating a candidate WAF rule based on the provider-agnostic language representation and the capability model; generating a first vector representation of the provider-agnostic language representation in a vector database; generating a candidate vector representation of the candidate WAF rule in the vector database; computing a distance between the first vector representation and the candidate vector representation; and determining the candidate WAF rule as the target WAF rule when the computed distance is below a predetermined distance threshold.

In some embodiments, generating the target WAF rule includes detecting a security intent of the source WAF rule based on the provider-agnostic language representation; determining, using the capability model of the target WAF provider, when the security intent can be implemented in the target WAF rule with reduced complexity from the source WAF rule; and, when the security intent can be implemented with reduced complexity, generating a reduced-complexity target WAF rule for the target WAF provider. For example, where the source WAF rule achieves a geo block by enumerating many IP addresses, the translated rule may be simplified to a single geo-match control in the target WAF provider. Conversely, where the abstracted goal is "block China" but the target provider does not support geo controls, a translated rule may be generated that implements the goal using an IP list or other available constructs (e.g., maintaining a list updated from a geo-IP mapping source), thereby producing a translated configuration compatible with the target WAF provider's constraints. In another example, a source rule that includes unreachable branches or redundant conditions may be simplified by removing conditions that never affect enforcement, thereby producing an equivalent but more efficient translated rule/policy.

In some embodiments, the generation of the target WAF rule may include selecting an equivalent (or most-similar) target control when an exact match is unavailable, and generating a confidence score or similarity ranking for the translation (e.g., "high confidence: native geo-block available," "medium confidence: approximated via IP lists," "low confidence: requires different service tier or lacks a comparable managed rule set").

At S660, a staged deployment of the target WAF rule is coordinated in the target WAF provider.

The staged deployment enables controlled introduction of the translated WAF rule to reduce operational risk, such as false positives, service disruption, a combination thereof, or the like. Deployment stages may include evaluation modes, partial traffic exposure, or phased activation across applications or regions.

In some embodiments, coordinating the staged deployment includes maintaining active enforcement of security controls in both the source WAF provider and the target WAF provider during a migration interval, such that protection of protected web application assets is continuously enforced by at least one of the source WAF provider or the target WAF provider at all times.

In some embodiments, coordinating the staged deployment includes, prior to deploying the target WAF rule, executing a machine learning model trained on historical traffic telemetry to predict an impact of the target WAF rule on legitimate traffic; computing at least one risk metric indicative of legitimate traffic disruption based on the prediction; and adjusting deployment parameters of the staged deployment based on the computed risk metric.

Although FIG. 6 shows example blocks of process illustrated in example flowchart 600, in some implementations, example flowchart 600 may include additional blocks, fewer blocks, different blocks, or differently arranged blocks than those depicted in FIG. 6. Additionally, or alternatively, two or more of the blocks of the process may be performed in parallel.

Figure 7:
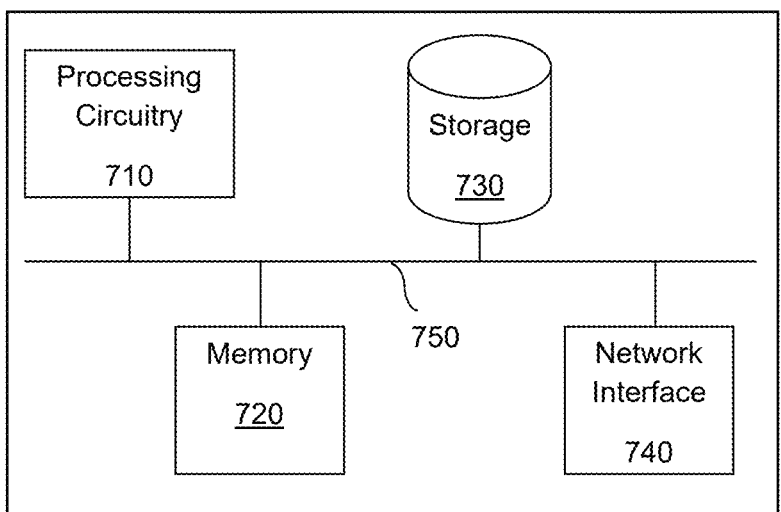
FIG. 7 is an example block diagram of a hardware architecture of a compute device.

FIG. 7 is an example block diagram of a hardware architecture 700 of a compute device. In an embodiment, the misconfiguration detection system 130 can be realized using the hardware architecture 700. In an embodiment, the cross-provider migration system 135 can be realized using the hardware architecture 700.

The hardware architecture 700 includes a processing circuitry 710 coupled to a memory 720, a storage 730, and a network interface 740. In an embodiment, the components may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), graphics processing units (GPUs), system-on-a-chip systems (SOCs), general-purpose microprocessors, microcontrollers, digital signal processors (DSPs), and the like, or any other hardware logic components that can perform calculations or other manipulations of information.

In at least some embodiments, the processing circuitry 710 is configured to execute generative artificial intelligence (genAI) models, perform inference using or otherwise apply genAI models, train genAI models, fine-tune genAI models, combinations thereof, and the like. Such genAI models are configured to produce text, images, videos, or other forms of data, and may include, but are not limited to, language models (for example, but not limited to, large language models, small language models, etc.), text-to-image artificial intelligence (AI) image generation systems, text-to-video AI video generators, combinations thereof, and the like. To this end, the processing circuitry 710 may be adapted to realize a transformer deep learning architecture (e.g., a generative pre-trained transformer [GPT], bidirectional encoder representations from transformers [BERT], text-to-text transfer transformer [T5], etc.), a diffusion model, both, and the like.

In accordance with various such embodiments, the hardware utilized for the processing circuitry 710 is selected in order to enable genAI functionality based on factors such as, but not limited to, parallelism (e.g., amounts of parallel processing to be performed), memory demands (e.g., amounts of random access memory [RAM] utilized to store model weights and training during processing or video RAM [VRAM] to support large language models), clock speeds, thread counts, storage (for example, to support certain amounts of storage or storage speeds), cooling (e.g., liquid cooling or air cooling systems), power supply (e.g., in order to enable a target wattage used for certain kinds of activities), networking and connectivity (e.g., in order to support seamless data transfer for deployments involving communications between or among multiple machines or clusters), combinations thereof, and the like.

In embodiments which utilize large language models (LLMs) or otherwise perform operations which may require or be enhanced through use of parallel processing, the processing circuitry 710 may include one or more GPUs or other processing units suitable for parallel processing. Such GPUs may be configured to perform matrix multiplication operations including, but not limited to, performing dot product operations in order to support neural network operations (for example, by performing dot product operations for hidden layer computations) or performing dot product operations in an attention mechanism in order to compute a similarity score between vectors during attention weight computation. In at least some such embodiments using GPUs, the processing circuitry 710 may include a number of CPU cores which is equal to or greater than the number of GPUs in order to facilitate or otherwise support parallel processing via multiple GPUs.

The memory 720 may be volatile (e.g., RAM, etc.), non-volatile (e.g., ROM, flash memory, etc.), or any combination thereof. In one configuration, computer-readable instructions needed to implement one or more embodiments disclosed herein may be stored in the storage 730.

In another embodiment, the memory 720 is configured to store software. Software shall be construed broadly to mean any type of instructions, whether referred to as software, firmware, middleware, microcode, or hardware description language. Instructions may include code (e.g., in source code format, binary code format, executable code format, or any other suitable format of code). The instructions, when executed by the one or more processors, cause the processing circuitry 710 to perform the various processes described herein.

In some embodiments, the storage 730 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 740 allows the client 120 to communicate with the Internet or a local area network. The network interface 740 communicate with these elements.

It should be understood that the embodiments described herein are not limited to the specific architecture illustrated in FIG. 7 and that other architectures may be equally used without departing from the scope of the disclosed embodiments.

It should be further noted that cross-provider migration system 135 and/or misconfiguration detection system 135 may be realized using a computing architecture similar to the architecture illustrated in FIG. 7 but that other architectures may be equally used without departing from the scope of the disclosed embodiments. Further, the memory 720 may include instructions for executing the function of the respective device.

The various embodiments disclosed herein can be implemented as any combination of hardware, firmware, and software. Moreover, the software is preferably implemented as an application program tangibly embodied on a program storage unit or computer-readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and a microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

It should be understood that any reference to an element herein using a designation such as "first," "second," and so forth does not generally limit the quantity or order of these elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements. In addition, terminology of the form "at least one of A, B, or C" or "one or more of A, B, or C" or "at least one of the groups consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the disclosed embodiments and the concepts contributed by the inventor to further the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for migrating web application firewall (WAF) rules across different WAF providers, comprising:

parsing a plurality of WAF rules from a plurality of WAF providers, wherein the plurality of WAF rules is expressed in varying provider-specific formats;

enriching a source WAF rule of a source WAF provider of the plurality of WAF providers with organizational context derived from a plurality of signals from a tenant computing environment;

generating, using a trained cross-provider semantic similarity model, a provider-agnostic language representation of the source WAF rule based on the provider-specific format of the source WAF rule and the organizational context;

constructing a capability model of a target WAF provider of the plurality of WAF providers including at least rule types, features, and constraints supported by a target WAF provider;

generating, using the trained cross-provider semantic similarity model, a target WAF rule for deployment in the target WAF provider based on the provider-agnostic language representation of the source WAF rule and compatible with the capability model of the target WAF provider; and coordinating a staged deployment of the target WAF rule in the target WAF provider.

2. The method of claim 1, generating the target WAF rule further comprises:

generating a candidate WAF rule for deployment in the target WAF provider based on the provider-agnostic language representation of the source WAF rule and the capability model of the target WAF provider;

generating a first vector representation, in a vector database, of the provider-agnostic language representation of the source WAF rule;

generating a candidate vector representation, in the vector database, of the candidate WAF rule;

computing a distance in the vector database between the first vector representation and the candidate vector representation; and determining the candidate WAF rule as the target WAF rule when the computed distance is below a predetermined distance threshold.

3. The method of claim 1, further comprising:

detecting a security intent of the source WAF rule based on the provider-agnostic language representation;

determining, using the capability model of the target WAF provider, when the security intent can be implemented in the target WAF rule with reduced complexity from the source WAF rule; and when the security intent can be implemented in the target WAF rule with reduced complexity from the source WAF rule, generating a reduced-complexity target WAF rule for the target WAF provider.

4. The method of claim 1, wherein generating the provider-agnostic language representation further comprises:

encoding parsed logic, conditions, match fields, and actions of the source WAF rule into a vectorized representation using the trained cross-provider semantic similarity model that transforms rule structures into numerical feature vectors;

computing, by the trained cross-provider semantic similarity model, semantic similarity scores between the vectorized representation of the source WAF rule and a plurality of predefined universal security intent representations corresponding to common web application protection objectives; and selecting, based on the computed semantic similarity scores satisfying a predetermined similarity threshold, a normalized security intent definition that represents an underlying security objective of the source WAF rule independently of vendor-specific syntax.

5. The method of claim 1, wherein enriching the source WAF rule with organizational context further comprises:

analyzing the plurality of signals including domain relationships, infrastructure metadata, certificate associations, and traffic characteristics clustering a plurality of web application assets of the tenant into logical application groupings; and associating the source WAF rule with at least one clustered web application asset.

6. The method of claim 5, wherein clustering a plurality of web application assets of the tenant into logical application groupings further comprises:

assigning weights to the multiple signals;

computing a composite correlation score for a pair of web application assets; and merging the pair web application assets into a common cluster when the composite correlation score exceeds a predetermined threshold.

7. The method of claim 1, further comprising:

detecting, using the trained cross-provider semantic similarity model, a security intent of each WAF rule of the plurality of WAF rules;

correlating security intents of the plurality of WAF rules with the plurality of signals including business logic, observed traffic patterns, and protected application assets of the tenant;

detecting at least one of conflicting rules, redundant rules, ineffective rules, coverage gaps, or rules misaligned with the organizational context.

8. The method of claim 1, wherein coordinating the staged deployment further comprises:

maintaining active enforcement of security controls in both the source WAF provider and the target WAF provider during a migration interval, such that protection of protected web application assets is continuously enforced by at least one of the source WAF provider or the target WAF provider at all times.

9. The method of claim 1, wherein coordinating the staged deployment further comprises:

prior to deploying the target WAF rule, executing a machine learning model trained on historical traffic telemetry to predict an impact of the target WAF rule on legitimate traffic;

computing at least one risk metric indicative of legitimate traffic disruption based on the prediction; and adjusting deployment parameters of the staged deployment based on the computed risk metric.

10. A non-transitory computer-readable medium storing a set of instructions for migrating web application firewall (WAF) rules across different WAF providers, the set of instructions comprising:

one or more instructions that, when executed by one or more processing circuitries of a device, cause the device to:

parse a plurality of WAF rules from a plurality of WAF providers, wherein the plurality of WAF rules is expressed in varying provider-specific formats;

enrich a source WAF rule of a source WAF provider of the plurality of WAF providers with organizational context derived from a plurality of signals from a tenant computing environment;

generate, using a trained cross-provider semantic similarity model, a provider-agnostic language representation of the source WAF rule based on the provider-specific format of the source WAF rule and the organizational context;

construct a capability model of a target WAF provider of the plurality of WAF providers including at least rule types, features, and constraints supported by a target WAF provider;

generate, using the trained cross-provider semantic similarity model, a target WAF rule for deployment in the target WAF provider based on the provider-agnostic language representation of the source WAF rule and compatible with the capability model of the target WAF provider; and coordinate a staged deployment of the target WAF rule in the target WAF provider.

11. A system for migrating web application firewall (WAF) rules across different WAF providers comprising:

a processing circuitry;

a memory, the memory containing instructions that, when executed by the processing circuitry, configure the system to:

parse a plurality of WAF rules from a plurality of WAF providers, wherein the plurality of WAF rules is expressed in varying provider-specific formats;

enrich a source WAF rule of a source WAF provider of the plurality of WAF providers with organizational context derived from a plurality of signals from a tenant computing environment;

generate, using a trained cross-provider semantic similarity model, a provider-agnostic language representation of the source WAF rule based on the provider-specific format of the source WAF rule and the organizational context;

construct a capability model of a target WAF provider of the plurality of WAF providers including at least rule types, features, and constraints supported by a target WAF provider;

generate, using the trained cross-provider semantic similarity model, a target WAF rule for deployment in the target WAF provider based on the provider-agnostic language representation of the source WAF rule and compatible with the capability model of the target WAF provider; and coordinate a staged deployment of the target WAF rule in the target WAF provider.

12. The system of claim 11, wherein the memory contains further instructions which when executed by the processing circuitry further configure the system to:

generate the target WAF rule further comprises:

generate a candidate WAF rule for deployment in the target WAF provider based on the provider-agnostic language representation of the source WAF rule and the capability model of the target WAF provider;

generate a first vector representation, in a vector database, of the provider-agnostic language representation of the source WAF rule;

generate a candidate vector representation, in the vector database, of the candidate WAF rule;

compute a distance in the vector database between the first vector representation and the candidate vector representation; and determine the candidate WAF rule as the target WAF rule when the computed distance is below a predetermined distance threshold.

13. The system of claim 11, wherein the memory contains further instructions which when executed by the processing circuitry further configure the system to:

detect a security intent of the source WAF rule based on the provider-agnostic language representation;

determine, using the capability model of the target WAF provider, when the security intent can be implemented in the target WAF rule with reduced complexity from the source WAF rule; and when the security intent can be implemented in the target WAF rule with reduced complexity from the source WAF rule, generate a reduced-complexity target WAF rule for the target WAF provider.

14. The system of claim 11, wherein the memory contains further instructions that, when executed by the processing circuitry for generating the provider-agnostic language representation, further configure the system to:

encode parsed logic, conditions, match fields, and actions of the source WAF rule into a vectorized representation using the trained cross-provider semantic similarity model that transforms rule structures into numerical feature vectors;

compute, by the trained cross-provider semantic similarity model, semantic similarity scores between the vectorized representation of the source WAF rule and a plurality of predefined universal security intent representations corresponding to common web application protection objectives; and select, based on the computed semantic similarity scores satisfying a predetermined similarity threshold, a normalized security intent definition that represents an underlying security objective of the source WAF rule independently of vendor-specific syntax.

15. The system of claim 11, wherein the memory contains further instructions that, when executed by the processing circuitry for enriching the source WAF rule with organizational context, further configure the system to:

analyze the plurality of signals including domain relationships, infrastructure metadata, certificate associations, and traffic characteristics clustering a plurality of web application assets of the tenant into logical application groupings; and associate the source WAF rule with at least one clustered web application asset.

16. The system of claim 15, wherein the memory contains further instructions that, when executed by the processing circuitry for clustering a plurality of web application assets of the tenant into logical application groupings, further configure the system to:

assign weights to the multiple signals;

compute a composite correlation score for a pair of web application assets; and merge the pair web application assets into a common cluster when the composite correlation score exceeds a predetermined threshold.

17. The system of claim 11, wherein the memory contains further instructions which when executed by the processing circuitry further configure the system to:

detect, using the trained cross-provider semantic similarity model, a security intent of each WAF rule of the plurality of WAF rules;

correlate security intents of the plurality of WAF rules with the plurality of signals including business logic, observed traffic patterns, and protected application assets of the tenant; and detect at least one of conflicting rules, redundant rules, ineffective rules, coverage gaps, or rules misaligned with the organizational context.

18. The system of claim 11, wherein the memory contains further instructions that, when executed by the processing circuitry for coordinating the staged deployment, further configure the system to:

maintain active enforcement of security controls in both the source WAF provider and the target WAF provider during a migration interval, such that protection of protected web application assets is continuously enforced by at least one of the source WAF provider or the target WAF provider at all times.

19. The system of claim 11, wherein the memory contains further instructions that, when executed by the processing circuitry for coordinating the staged deployment, further configure the system to:

prior to deploying the target WAF rule, execute a machine learning model trained on historical traffic telemetry to predict an impact of the target WAF rule on legitimate traffic;

compute at least one risk metric indicative of legitimate
 traffic disruption based on the prediction; and
and adjust deployment parameters of the staged deploy-
 ment based on the computed risk metric.

* * * * *